United States Patent
Nishitani et al.

(10) Patent No.: US 9,877,027 B2
(45) Date of Patent: *Jan. 23, 2018

(54) MOVING PICTURE CODING DEVICE, MOVING PICTURE CODING METHOD, AND MOVING PICTURE CODING PROGRAM, AND MOVING PICTURE DECODING DEVICE, MOVIING PICTURE DECODING METHOD, AND MOVING PICTURE DECODING PROGRAM

(71) Applicant: JVC KENWOOD Corporation, Yokohama-shi (JP)

(72) Inventors: Masayoshi Nishitani, Yokosuka (JP); Hiroya Nakamura, Yokosuka (JP); Shigeru Fukushima, Yokosuka (JP); Motoharu Ueda, Yokosuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/493,891

(22) Filed: Apr. 21, 2017

(65) Prior Publication Data

US 2017/0230657 A1 Aug. 10, 2017

Related U.S. Application Data

(63) Continuation of application No. 14/295,860, filed on Jun. 4, 2014, now Pat. No. 9,667,989, which is a (Continued)

(30) Foreign Application Priority Data

Dec. 13, 2011 (JP) .................................. 2011-272470
Dec. 13, 2011 (JP) .................................. 2011-272471

(Continued)

(51) Int. Cl.
*H04N 7/12* (2006.01)
*H04N 19/124* (2014.01)
(Continued)

(52) U.S. Cl.
CPC ......... *H04N 19/124* (2014.11); *H04N 19/126* (2014.11); *H04N 19/136* (2014.11);
(Continued)

(58) Field of Classification Search
None
See application file for complete search history.

(56) References Cited

U.S. PATENT DOCUMENTS 9,135,724 B2 * 9/2015 Sato ....................... H04N 19/61
2009/0177952 A1 7/2009 Yokosato et al.
2013/0022108 A1 * 1/2013 Panusopone ......... H04N 19/159
375/240.03

FOREIGN PATENT DOCUMENTS

CN 101779467 A 7/2010
JP 2011-091772 A 5/2011
(Continued)

OTHER PUBLICATIONS

Aoki et al. (Document: JCTVC-G1028, Joint Collaborative Team on Video Coding (JCT-VC) of ITU-T SG16 WP3 and ISO/IEC JTC1/SC29/WG11, 7th Meeting: Geneva, CH, Nov. 21-30, 2011).*

(Continued)

*Primary Examiner* — Dakshesh Parikh
(74) *Attorney, Agent, or Firm* — Venable LLP; Michael A. Sartori; Miguel A. Lopez

(57) ABSTRACT

In a moving picture coding device that codes moving pictures in units of a block by partitioning a first block, which is obtained by partitioning each picture of the moving pictures into predetermined sizes, into one or a plurality of second blocks, a quantization parameter calculation unit
(Continued)

calculates a quantization parameter of the second block. A predictive quantization parameter deriving unit derives a predictive quantization parameter of the second block using quantization parameters of a third block adjacent to the left of the second block and a fourth block adjacent to the top of the second block. A differential quantization parameter generation unit generates a differential quantization parameter of the second block from a difference between the quantization parameter of the second block and the predictive quantization parameter. A first bitstream generation unit codes the differential quantization parameter of the second block.

3 Claims, 19 Drawing Sheets

Related U.S. Application Data continuation of application No. PCT/JP2012/007964, filed on Dec. 13, 2012.

(30) Foreign Application Priority Data

Dec. 12, 2012 (JP) .................. 2012-271418
Dec. 12, 2012 (JP) .................. 2012-271419

(51) Int. Cl.
 *H04N 19/176* (2014.01)
 *H04N 19/126* (2014.01)
 *H04N 19/136* (2014.01)
 *H04N 19/196* (2014.01)
 *H04N 19/96* (2014.01)
 *H04N 19/463* (2014.01)
 *H04N 19/184* (2014.01)
 *H04N 19/50* (2014.01)
 *H04N 19/14* (2014.01)
 *H04N 19/172* (2014.01)

(52) U.S. Cl.
 CPC ........... *H04N 19/14* (2014.11); *H04N 19/176* (2014.11); *H04N 19/184* (2014.11); *H04N 19/196* (2014.11); *H04N 19/463* (2014.11); *H04N 19/50* (2014.11); *H04N 19/96* (2014.11); *H04N 19/172* (2014.11)

(56) References Cited

FOREIGN PATENT DOCUMENTS

| WO | 2011/043793 | A1 | | 4/2011 | |
|----|-------------|----|---|--------|---|
| WO | 2011/086779 | A1 | | 7/2011 | |
| WO | 2011/145836 | A2 | | 11/2011 | |
| WO | 2012/124461 | A1 | | 9/2012 | |
| WO | WO2012124461 | A1 | * | 9/2012 | ............. H04N 19/61 |

OTHER PUBLICATIONS

Hirofumi Aoki et al., "Non-CE4: Rate control friendly spatial QP prediction," Joint Collaborative Team on Video Coding (JCT-VC) of ITU-T SG16 WP3 and ISO/IEC JTC1/SC29/WG11 7th Meeting: Geneva, CH, Nov. 27, 2011, [JCTVC-G1028]. [Cited in Parent].
Hiroya Nakamura et al., "Non-CE4: Compatible QP prediction with RC and AQ," Joint Collaborative Team on Video Coding (JCT-VC) of ITU-T SG16 WP3 and ISO/IEC JTC1/SC29/WG11 8th Meeting: San Jose, CA, Feb. 7, 2012, [JCTVC-H0204]. [Cited in Parent].
International Search Report in PCT International Application No. PCT/JP2012/007964, dated Mar. 12, 2013. [Cited in Parent].
International Preliminary Report on Patentability and Written Opinion in PCT International Application No. PCT/JP2012/007964, dated Jun. 17, 2014. [Cited in Parent].
Extended European Search Report in European Patent Application No. 12857656.8, dated Jun. 19, 2015. [Cited in Parent].
Coban et al., "CE4 Subtest 2: QP prediction from spatially neighboring CUs (test 2.3b, 2.3c)" Joint Collaborative Team on Video Coding (JCT-VC) of ITU-T SG16 WP3 and ISO/IEC JTC1/SC29/WG11, 6th Meeting: Torino, IT, Jul. 14-22, 2011 [Cited in Parent].
Nakamura et al., "Non-CE4: QP prediction using spatial QP," Joint Collaborative Team on Video Coding (JCT-VC) of ITU-T SG16 WP3 and ISO/IEC JTC1/SC29/WG11, 7th Meeting: Geneva CH, Nov. 21-30, 2011 [Cited in Parent].
Fang et al., "A Unified LCU, sub-LCU and sub-CU (TU) Delta QP Signaling," Joint Collaborative Team on Video Coding (JCT-VC) of ITU-T SG16 WP3 and ISO/IEC JTC1/SC29/WG11 7th Meeting: Geneva, CH, Nov. 2011 [Cited in Parent].

* cited by examiner

FIG.10

| ABSOLUTE VALUE OF DIFFERENCE | CODE WORD |
|---|---|
| 0 | 1 |
| 1 | 010 |
| −1 | 011 |
| 2 | 00100 |
| −2 | 00101 |
| 3 | 00110 |
| −3 | 00111 |
| 4 | 0001000 |
| −4 | 0001001 |
| 5 | 0001010 |
| −5 | 0001011 |
| 6 | 0001100 |
| −6 | 000101 |
| 7 | 0001110 |
| −7 | 0001111 |
| ⋮ | ⋮ |

MOVING PICTURE CODING DEVICE, MOVING PICTURE CODING METHOD, AND MOVING PICTURE CODING PROGRAM, AND MOVING PICTURE DECODING DEVICE, MOVING PICTURE DECODING METHOD, AND MOVING PICTURE DECODING PROGRAM

CROSS-REFERENCE TO RELATED APPLICATIONS

This application is a Continuation of U.S. patent application Ser. No. 14/295,860, filed Jun. 4, 2014, which is a Continuation of International Application No. PCT/JP2012/007964, filed Dec. 13, 2012, which claims the benefit of Japanese Patent Application Nos. 2011-272470 and 2011-272471, filed Dec. 13, 2011, and 2012-271418 and 2012-271419, filed Dec. 12, 2012.

BACKGROUND OF THE INVENTION

1. Field of the Invention

The present invention relates to moving picture coding and decoding techniques, and in particular, to moving picture coding and decoding techniques using predictive coding of a quantization parameter.

2. Description of the Related Art

In digital moving picture coding, such as MPEG-2 Part2 (hereinafter, referred to as MPEG-2) or MPEG-4 Part10/H.264 (hereinafter, referred to as AVC), each picture is partitioned into blocks having a predetermined size and coding is performed, and a quantization parameter indicating the roughness of quantization for a prediction error signal (or simply a picture signal) is transmitted. By variably controlling the quantization parameter in units of a predetermined block on the coding side, it is possible to control the code amount or to improve the subjective picture quality.

As quantization parameter control for improving the subjective picture quality, Adaptive Quantization is often used. In the adaptive quantization, change according to the activity of each macroblock is made such that quantization is applied more finely in a flat portion, in which deterioration is visually easily recognized, and quantization is applied more coarsely in a complex design portion, in which the visual recognition of deterioration is relatively difficult. That is, in a macroblock with high activity for which the assigned bit amount at the time of coding tends to increase, the quantization parameter is changed so that the large quantization scale is set. As a result, the subjective picture quality is improved while performing control such that the number of bits in the data of the coded picture is reduced as much as possible.

In the MPEG-2, it is determined whether or not the quantization parameter of the last block in coding/decoding order is the same as the quantization parameter of a block to be coded, and the quantization parameter is transmitted when the quantization parameter of the last block is not the same as the quantization parameter of the block to be coded. In the AVC, differential coding of the quantization parameter of the block to be coded is performed using the quantization parameter of the last block in coding/decoding order as a predicted value. This is based on the fact that code amount control is performed in coding order in general, and accordingly, the quantization parameter of the last block in coding order is closest to the quantization parameter of the coding block, and the purpose is to suppress the amount of information of the quantization parameter to be transmitted.

CITATION LIST

Patent Literature

[Patent Literature 1] Japanese Patent Application Laid-Open No. 2011-91772

In known quantization parameter control, the code amount of the quantization parameter has been reduced by calculating the difference between the quantization parameter of a coded block on the left side as a predictive quantization parameter and the quantization parameter of a block to be coded and coding the calculated differential quantization parameter. However, depending on the content in a screen, for example, when the features of a picture in a block to be coded and a picture in a coded block on the left side are different as shown in FIG. 8, the difference between the quantization parameters calculated by the adaptive quantization is increased. In this case, even if quantization parameter prediction using the left block is performed uniformly, the differential quantization parameter becomes large. Accordingly, there has been a problem in that the code amount is increased.

In addition, since quantization parameters calculated by the code amount control are performed in raster scan order from the upper left to the lower right of the normal screen, processing turns of slices become away from each other if the block size to be coded is reduced. For this reason, when the quantization parameter of a coded block above which a block to be coded is adjacent is used for prediction, these blocks are adjacent to each other but the processing turns in the code amount control are away from each other. Therefore, there is no chance that the quantization parameters calculated by the code amount control will necessarily become the same value or close values in the block to be coded and a coded block adjacent to the top of the block to be coded. As a result, there has been a problem in that it cannot be said that the code amount of the differential quantization parameter can be reduced.

SUMMARY OF THE INVENTION

The present invention has been made in view of such a situation, and it is an object of the present invention to provide a technique for improving the coding efficiency by reducing the code amount of the quantization parameter.

In order to solve the problem described above, a moving picture coding device according to an aspect of the present invention is a moving picture coding device that codes moving pictures in units of a block by partitioning a first block, which is obtained by partitioning each picture of the moving pictures into predetermined sizes, into one or a plurality of second blocks. The moving picture coding device includes: a quantization parameter calculation unit (110) configured to calculate a quantization parameter of the second block; a predictive quantization parameter deriving unit (114) configured to derive a predictive quantization parameter of the second block using quantization parameters of a third block adjacent to the left of the second block and a fourth block adjacent to the top of the second block; a differential quantization parameter generation unit (111) configured to generate a differential quantization parameter of the second block from a difference between the quantization parameter of the second block and the predictive quantization parameter; and a coding unit (112) configured to code the differential quantization parameter of the second block. The predictive quantization parameter deriving unit (114) sets the quantization parameter of the third block as a first quantization parameter when the third block is at a position not beyond a boundary of the first block, sets a quantization parameter of a fifth block coded before the second block as the first quantization parameter when the third block is at a position beyond the boundary of the first block, sets the quantization parameter of the fourth block as a second quantization parameter when the fourth block is at a position not beyond the boundary of the first block, sets the quantization parameter of the fifth block as the second quantization parameter when the fourth block is at a position beyond the boundary of the first block, and derives the predictive quantization parameter of the second block using the first and second quantization parameters.

Another aspect of the present invention is also a moving picture coding device. This device is a moving picture coding device that codes moving pictures in units of a coding block by partitioning a block, which is obtained by partitioning each picture of the moving pictures into predetermined sizes, into one or a plurality of coding blocks. The device includes: a quantization parameter calculation unit (110) configured to calculate a quantization parameter of the coding block; a predictive quantization parameter deriving unit (114) configured to derive a predictive quantization parameter of the coding block using quantization parameters of coded neighboring blocks adjacent to the coding block; a differential quantization parameter generation unit (111) configured to generate a differential quantization parameter of the coding block from a difference between the quantization parameter of the coding block and the predictive quantization parameter; and a coding unit (112) configured to code the differential quantization parameter of the coding block. When a neighboring block adjacent to the coding block in a predetermined direction of the coding block is at a position beyond a boundary of the block having the predetermined size, the predictive quantization parameter deriving unit (114) derives the predictive quantization parameter of the coding block using quantization parameters of other coded blocks that are different from the neighboring block adjacent to the coding block in the predetermined direction.

Still another aspect of the present invention is a moving picture coding method. This method is a moving picture coding method of coding moving pictures in units of a block by partitioning a first block, which is obtained by partitioning each picture of the moving pictures into predetermined sizes, into one or a plurality of second blocks. The method includes: a quantization parameter calculation step of calculating a quantization parameter of the second block; a predictive quantization parameter deriving step of deriving a predictive quantization parameter of the second block using quantization parameters of a third block adjacent to the left of the second block and a fourth block adjacent to the top of the second block; a differential quantization parameter generation step of generating a differential quantization parameter of the second block from a difference between the quantization parameter of the second block and the predictive quantization parameter; and a coding step of coding the differential quantization parameter of the second block. In the predictive quantization parameter deriving step, the quantization parameter of the third block is set as a first quantization parameter when the third block is at a position not beyond a boundary of the first block, a quantization parameter of a fifth block coded before the second block is set as the first quantization parameter when the third block is at a position beyond the boundary of the first block, the quantization parameter of the fourth block is set as a second quantization parameter when the fourth block is at a position not beyond the boundary of the first block, the quantization parameter of the fifth block is set as the second quantization parameter when the fourth block is at a position beyond the boundary of the first block, and the predictive quantization parameter of the second block is derived using the first and second quantization parameters.

A moving picture decoding device according to an aspect of the present invention is a moving picture decoding device that decodes a bitstream in which moving pictures are coded by partitioning a first block, which is obtained by partitioning each picture of the moving pictures into predetermined sizes, into one or a plurality of second blocks. The moving picture decoding device includes: a decoding unit (202) configured to extract a differential quantization parameter of the second block by decoding the bitstream; a predictive quantization parameter deriving unit (205) configured to derive a predictive quantization parameter of the second block using quantization parameters of a third block adjacent to the left of the second block and a fourth block adjacent to the top of the second block; and a quantization parameter generation unit (203) configured to generate a quantization parameter of the second block by adding the differential quantization parameter of the second block and the predictive quantization parameter. The predictive quantization parameter deriving unit (205) sets the quantization parameter of the third block as a first quantization parameter when the third block is at a position not beyond a boundary of the first block, sets a quantization parameter of a fifth block decoded before the second block as the first quantization parameter when the third block is at a position beyond the boundary of the first block, sets the quantization parameter of the fourth block as a second quantization parameter when the fourth block is at a position not beyond the boundary of the first block, sets the quantization parameter of the fifth block as the second quantization parameter when the fourth block is at a position beyond the boundary of the first block, and derives the predictive quantization parameter of the second block using the first and second quantization parameters.

Another aspect of the present invention is also a moving picture decoding device. This device is a moving picture decoding device that decodes a bit stream in which moving pictures are coded in units of a coding block by partitioning a block, which is obtained by partitioning each picture of the moving pictures into predetermined sizes, into one or a plurality of coding blocks. The device includes: a decoding unit (202) configured to extract a differential quantization parameter of a decoding block by decoding the bit stream in units of a decoding block; a predictive quantization parameter deriving unit (205) configured to derive a predictive quantization parameter of the decoding block according to a prediction mode of the decoding block using quantization parameters of decoded neighboring blocks adjacent to the decoding block; and a quantization parameter generation unit (203) configured to generate a quantization parameter of the decoding block by adding the differential quantization parameter of the decoding block and the predictive quantization parameter. When a neighboring block adjacent to the decoding block in a predetermined direction of the decoding block is at a position beyond a boundary of the block having the predetermined size, the predictive quantization parameter deriving unit (205) derives the predictive quantization parameter of the decoding block using quantization parameters of other decoded blocks that are different from the neighboring block adjacent to the decoding block in the predetermined direction.

Still another aspect of the present invention is a moving picture decoding method. This method is a moving picture decoding method of decoding a bitstream in which moving pictures are coded by partitioning a first block, which is obtained by partitioning each picture of the moving pictures into predetermined sizes, into one or a plurality of second blocks. The method includes: a decoding step of extracting a differential quantization parameter of the second block by decoding the bitstream; a predictive quantization parameter deriving step of deriving a predictive quantization parameter of the second block using quantization parameters of a third block adjacent to the left of the second block and a fourth block adjacent to the top of the second block; and a quantization parameter generation step of generating a quantization parameter of the second block by adding the differential quantization parameter of the second block and the predictive quantization parameter. In the predictive quantization parameter deriving step, the quantization parameter of the third block is set as a first quantization parameter when the third block is at a position not beyond a boundary of the first block, a quantization parameter of a fifth block decoded before the second block is set as the first quantization parameter when the third block is at a position beyond the boundary of the first block, the quantization parameter of the fourth block is set as a second quantization parameter when the fourth block is at a position not beyond the boundary of the first block, the quantization parameter of the fifth block is set as the second quantization parameter when the fourth block is at a position beyond the boundary of the first block, and the predictive quantization parameter of the second block is derived using the first and second quantization parameters.

In addition, any combination of the above-described constituent elements and those obtained by converting the expression of the present invention into a method, a device, a system, a recording medium, a computer program, and the like are also effective as aspects of the present invention.

According to the present invention, it is possible to improve the coding efficiency by reducing the code amount of the quantization parameter.

BRIEF DESCRIPTION OF THE DRAWINGS

FIG. 10 is a diagram showing an example of a signed exponential-Golomb coding table of a differential quantization parameter.

DETAILED DESCRIPTION OF THE INVENTION

In embodiments of the present invention, in order to reduce the code amount of the quantization parameter of a block to be processed in moving picture coding in which each picture is partitioned into rectangular blocks having a predetermined size, the block is partitioned into one or a plurality of coding blocks, and quantization and coding are performed in units of a coding block, a code amount control technique for performing coding by deriving an optimal predictive quantization parameter from the coding information of neighboring coded blocks and calculating a difference from the predictive quantization parameter is provided.

Figure 1:
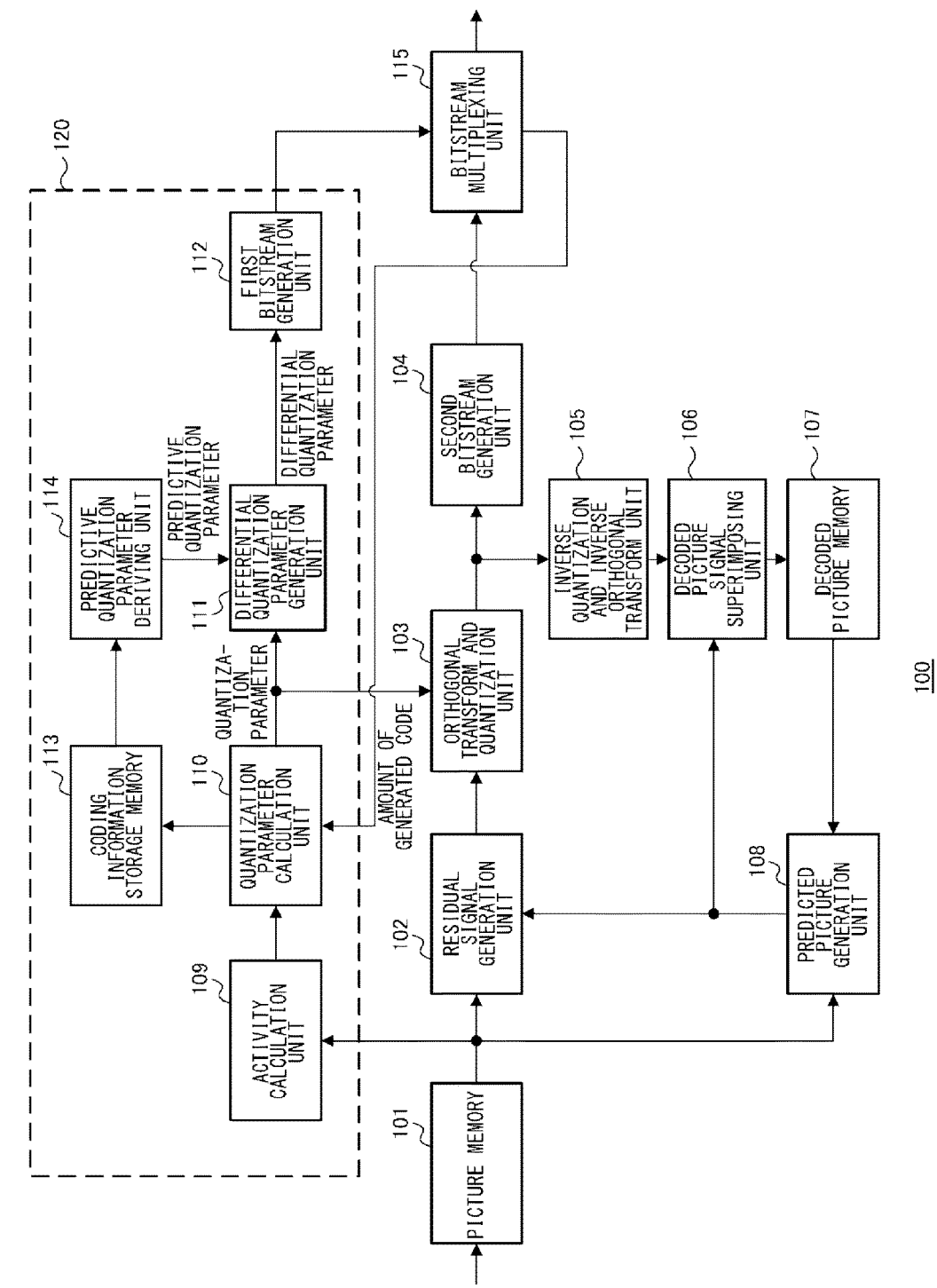
FIG. 1 is a block diagram showing the configuration of a moving picture coding device including a method of deriving a predictive quantization parameter according to an embodiment.

A moving picture coding device 100 and a moving picture decoding device 200 suitable for embodying the present invention will be described. FIG. 1 is a block diagram showing the configuration of the moving picture coding device 100 embodying the present invention. The moving picture coding device 100 is configured to include a picture memory 101, a residual signal generation unit 102, an orthogonal transform and quantization unit 103, a second bitstream generation unit 104, an inverse quantization and inverse orthogonal transform unit 105, a decoded picture signal superimposing unit 106, a decoded picture memory 107, a predicted picture generation unit 108, an activity calculation unit 109, a quantization parameter calculation unit 110, a differential quantization parameter generation unit 111, a first bitstream generation unit 112, a coding information storage memory 113, a predictive quantization parameter deriving unit 114, and a bitstream multiplexing unit 115. In addition, the thick solid arrow connecting blocks to each other indicates the flow of a picture signal of a picture, and the thin solid arrow indicates the flow of a parameter signal for controlling the coding.

The picture memory 101 temporarily stores a picture signal to be coded that is supplied in order of imaging/display time. The picture memory 101 supplies the stored picture signal to be coded to the residual signal generation unit 102, the predicted picture generation unit 108, and the activity calculation unit 109 in units of a predetermined pixel block. In this case, the pictures stored in order of imaging/display time are sorted in coding order, and are output from the picture memory 101 in units of a pixel block.

The residual signal generation unit 102 generates a residual signal by performing subtraction between the picture signal to be coded and a prediction signal generated by the predicted picture generation unit 108, and supplies the residual signal to the orthogonal transform and quantization unit 103.

The orthogonal transform and quantization unit 103 generates an orthogonally transformed and quantized residual signal by performing orthogonal transform and quantization on the residual signal, and supplies the orthogonally transformed and quantized residual signal to the second bitstream generation unit 104 and the inverse quantization and inverse orthogonal transform unit 105.

The second bitstream generation unit 104 generates a second bitstream by entropy-coding the orthogonally transformed and quantized residual signal according to the defined syntax rules, and supplies the second bitstream to the bitstream multiplexing unit 115.

The inverse quantization and inverse orthogonal transform unit 105 calculates a residual signal by performing inverse quantization and inverse orthogonal transform of the orthogonally transformed and quantized residual signal, which is supplied from the orthogonal transform and quantization unit 103, and supplies the residual signal to the decoded picture signal superimposing unit 106.

The decoded picture signal superimposing unit 106 generates decoded pictures by superimposing the predicted picture signal generated by the predicted picture generation unit 108 and the residual signal obtained by inverse quantization and inverse orthogonal transform of the inverse quantization and inverse orthogonal transform unit 105, and stores the decoded pictures in the decoded picture memory 107. In addition, a filtering process to reduce distortion, such as block distortion due to coding of decoded pictures, may be performed and the result may be stored in the decoded picture memory 107. In this case, predicted coding information, such as a flag for identifying the information of a post filter such as a deblocking filter, is stored in the coding information storage memory 113 when necessary.

From the picture signal supplied from the picture memory 101 and the decoded picture signal supplied from the decoded picture memory 107, the predicted picture generation unit 108 generates a predicted picture signal by performing intra prediction or inter prediction based on the prediction mode. The intra prediction is to generate a predicted picture signal using a pixel signal of a block to be coded, which is obtained by partitioning the picture signal supplied from the picture memory 101 in units of a predetermined block, and pixel signals, which are supplied from the decoded picture memory 107, of neighboring coded blocks adjacent to the block to be coded that are present in the same frame as the blocks to be coded. The inter prediction is to generate a predicted picture signal by performing block matching between a coding frame and a reference frame to calculate a motion amount called a motion vector and performing motion compensation from the reference frame based on the motion amount. The reference frame is a coded frame stored in the decoded picture memory 107 that is several frames away from the front or back in time series of a frame (coding frame) of a block to be coded obtained by partitioning the picture signal supplied from the picture memory 101 in units of a predetermined block. The predicted picture signal generated in this manner is supplied to the residual signal generation unit 102. Coding information such as a motion vector obtained by the predicted picture generation unit 108 is stored in the coding information storage memory 113 when necessary. In addition, when the selection of a plurality of prediction modes is possible, the predicted picture generation unit 108 determines an optimal prediction mode by evaluating the amount of distortion or the like between the generated predicted picture signal and the original picture signal, selects a predicted picture signal generated by prediction based on the determined prediction mode, and supplies the predicted picture signal to the residual signal generation unit 102. When the prediction mode is intra prediction, the intra prediction mode is supplied to the coding information storage memory 113 and the first bitstream generation unit.

The activity calculation unit 109 calculates an activity that is a coefficient indicating the complexity or smoothness of a picture of the block to be coded that is supplied from the picture memory 101, and supplies the activity to the quantization parameter calculation unit 110. The detailed configuration and operation of the activity calculation unit 109 will be described in embodiments below.

The quantization parameter calculation unit 110 calculates a quantization parameter of the block to be coded using the activity calculated by the activity calculation unit 109, and supplies the quantization parameter to the differential quantization parameter generation unit 111 and the coding information storage memory 113. The detailed configuration and operation of the quantization parameter calculation unit 110 will be described in embodiments below.

The differential quantization parameter generation unit 111 calculates a differential quantization parameter by subtracting the predictive quantization parameter derived by the predictive quantization parameter deriving unit 114 from the quantization parameter calculated by the quantization parameter calculation unit 110, and supplies the differential quantization parameter to the first bitstream generation unit 112.

The first bitstream generation unit 112 generates a first bitstream by coding the differential quantization parameter calculated by the differential quantization parameter generation unit 111 according to the defined syntax rules, and supplies the first bitstream to the bitstream multiplexing unit 115.

The coding information storage memory 113 stores the quantization parameter of the coded block. In addition, although no connection is shown in FIG. 1, coding information generated by the predicted picture generation unit 108, such as a prediction mode or a motion vector, is also stored as information required for coding the next block to be coded. In addition, coding information generated in units of a picture or a slice is also stored when necessary.

The predictive quantization parameter deriving unit 114 derives a predictive quantization parameter using coding information or quantization parameters of neighboring coded blocks adjacent to a block to be coded, and supplies the predictive quantization parameter to the differential quantization parameter generation unit 111. The detailed configuration and operation of the predictive quantization parameter deriving unit 114 will be described in embodiments below.

The bitstream multiplexing unit 115 multiplexes the first and second bitstreams according to the defined syntax rules, and outputs a bitstream.

Figure 2:
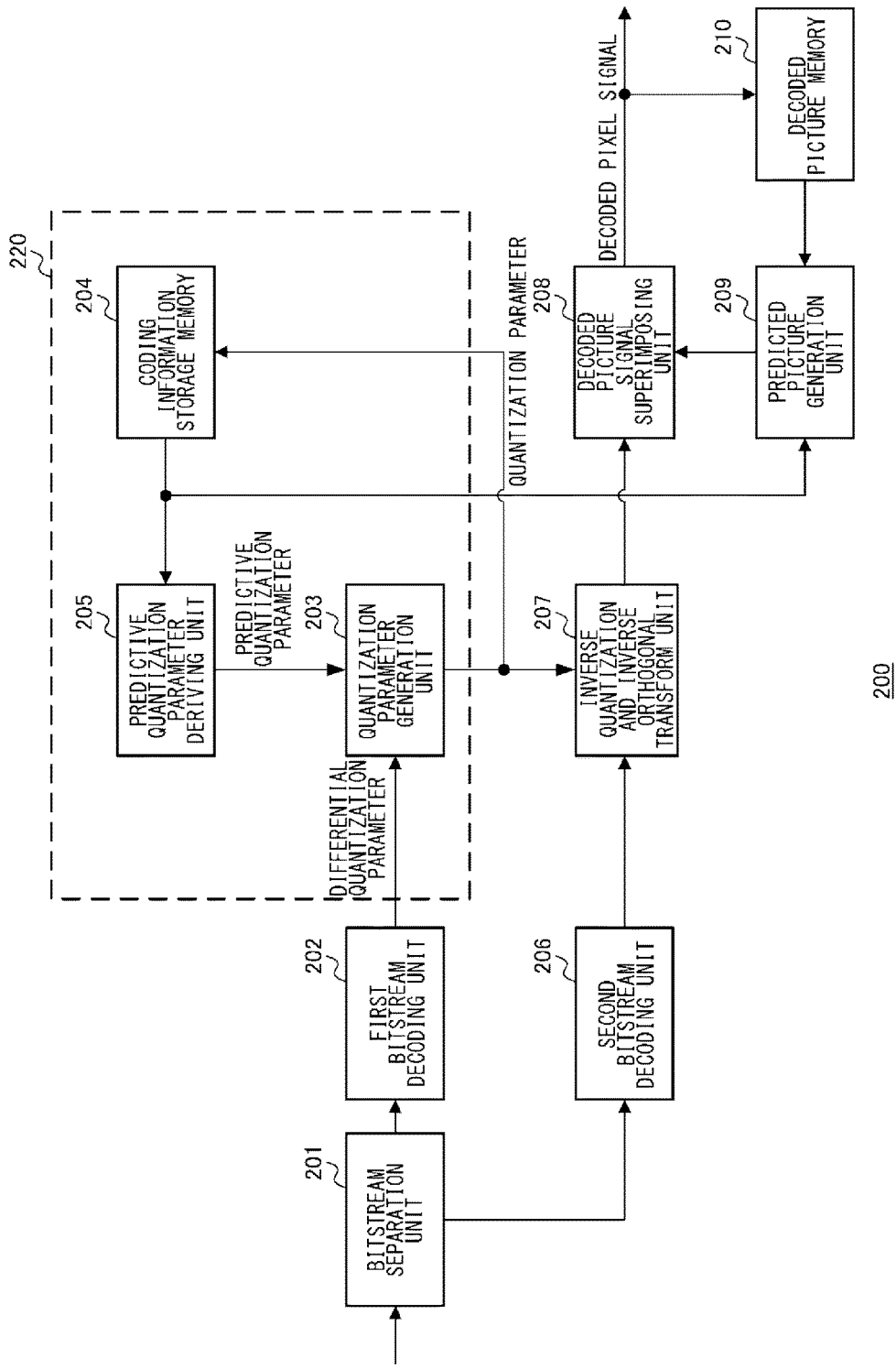
FIG. 2 is a block diagram showing the configuration of a moving picture decoding device including a method of deriving a predictive quantization parameter according to an embodiment.

FIG. 2 is a block diagram showing the configuration of the moving picture decoding device 200 according to an embodiment corresponding to the moving picture coding device 100 shown in FIG. 1. The moving picture decoding device 200 of the embodiment includes a bitstream separation unit 201, a first bitstream decoding unit 202, a quantization parameter generation unit 203, a coding information storage memory 204, a predictive quantization parameter deriving unit 205, a second bitstream decoding unit 206, an inverse quantization and inverse orthogonal transform unit 207, a decoded picture signal superimposing unit 208, a predicted picture generation unit 209, and a decoded picture memory 210. In addition, similarly to the moving picture coding device 100 shown in FIG. 1, the thick solid arrow connecting blocks to each other indicates the flow of a picture signal of a picture, and the thin solid arrow indicates the flow of a parameter signal for controlling the coding.

Since a decoding process of the moving picture decoding device 200 shown in FIG. 2 corresponds to the decoding process set in the moving picture coding device 100 shown in FIG. 1, each configuration of the inverse quantization and inverse orthogonal transform unit 207, the decoded picture signal superimposing unit 208, the predicted picture generation unit 209, the decoded picture memory 210, and the coding information storage memory 204 shown in FIG. 2 has a function corresponding to each configuration of the inverse quantization and inverse orthogonal transform unit 105, the decoded picture signal superimposing unit 106, the predicted picture generation unit 108, the decoded picture memory 107, and the coding information storage memory 113 of the moving picture coding device 100 shown in FIG. 1.

A bitstream supplied to the bitstream separation unit 201 is separated according to the defined syntax rules, and the separated bitstreams are supplied to the first bitstream decoding unit 202 and the second bitstream decoding unit 206.

The first bitstream decoding unit 202 decodes the supplied bitstream and outputs coding information regarding a prediction mode, a motion vector, a differential quantization parameter, and the like, and gives the differential quantization parameter to the quantization parameter generation unit 203 and stores the coding information in the coding information storage memory 204.

The quantization parameter generation unit 203 calculates a quantization parameter by adding the differential quantization parameter supplied from the first bitstream decoding unit 202 and the quantization parameter derived by the predictive quantization parameter deriving unit 205, and supplies the quantization parameter to the inverse quantization and inverse orthogonal transform unit 207 and the coding information storage memory 204.

The coding information storage memory 113 stores the quantization parameter of the decoded block. In addition, not only the coding information of the block unit decoded by the first bitstream decoding unit 202 but also coding information generated in units of a picture or a slice is stored when necessary. In addition, although no connection is shown in FIG. 2, coding information, such as a decoded prediction mode or motion vector, is supplied to the predicted picture generation unit 209.

The predictive quantization parameter deriving unit 205 derives a predictive quantization parameter using the coding information or quantization parameters of neighboring decoded blocks adjacent to a block to be decoded, and supplies the predictive quantization parameter to the quantization parameter generation unit 203. The predictive quantization parameter deriving unit 205 has the same function as the predictive quantization parameter deriving unit 114 of the moving picture coding device 100, and the detailed configuration and operation will be described in embodiments below.

The second bitstream decoding unit 206 calculates an orthogonally transformed and quantized residual signal by decoding the supplied bitstream, and gives the orthogonally transformed and quantized residual signal to the inverse quantization and inverse orthogonal transform unit 207.

The inverse quantization and inverse orthogonal transform unit 207 performs inverse orthogonal transform and inverse quantization for the orthogonally transformed and quantized residual signal decoded by the second bitstream decoding unit 206 using the quantization parameter generated by the quantization parameter generation unit 203, thereby obtaining an inversely orthogonal-transformed and inversely quantized residual signal.

The decoded picture signal superimposing unit 208 generates a decoded picture signal by superimposing the predicted picture signal generated by the predicted picture generation unit 209 and the residual signal obtained by inverse orthogonal transform and inverse quantization of the inverse quantization and inverse orthogonal transform unit 207, and outputs the decoded picture signal and stores the decoded picture signal in the decoded picture memory 210. When storing the decoded picture signal in the decoded picture memory 210, a filtering process for reducing block distortion or the like due to coding may be performed on the decoded pictures, and the result may be stored in the decoded picture memory 210.

The predicted picture generation unit 209 generates a predicted picture signal from the decoded picture signal, which is supplied from the decoded picture memory 210, based on the coding information such as a prediction mode or a motion vector decoded by the second bitstream decoding unit 206 and the coding information from the coding information storage memory 204, and supplies the predicted picture signal to the decoded picture signal superimposing unit 208.

Next, a method of deriving a predictive quantization parameter that is commonly performed in various units 120 surrounded by the thick dotted line in the moving picture coding device 100, in particular, the predictive quantization parameter deriving unit 114 and various units 220 surrounded by the thick dotted line in the moving picture decoding device 200, in particular, the predictive quantization parameter deriving unit 205 will be described in detail.

First, the operation of each unit of the various units 120 surrounded by the thick dotted line in the moving picture coding device 100 of the present embodiment will be described. In the various units 120, with a pixel block having a predetermined pixel size unit supplied from the picture memory 101 as a coding block, a quantization parameter for quantizing the block is determined. The quantization parameter is mainly determined by the algorithm of code amount control and adaptive quantization. First, the method of adaptive quantization in the activity calculation unit 109 will be described.

Generally, a human being has a visual characteristic that the eyes are sensitive to a low-frequency component with few edges. Therefore, the activity calculation unit 109 calculates the activity indicating the complexity or smoothness of a picture in units of a predetermined block such that quantization is applied more finely in a flat portion, in which deterioration is visually easily recognized, and quantization is applied more coarsely in a complex design portion, in which the visual recognition of deterioration is relatively difficult.

As an example of the activity, calculation using the variance of pixels in a coding block described in MPEG-2 TestMode15 (TM5) can be mentioned. The variance is a value indicating the degree of dispersion from the average of pixels that form each picture in a block. The variance decreases as a picture in a block becomes flat (brightness change decreases), and increases as the complexity of the design increases (brightness change increases). Therefore, the variance is used as an activity of the block. When the pixel value in a block is expressed as p(x, y), the activity act of the block is calculated by the following expression.

$$\text{act} = \sum_{x,y}^{BLK} (p(x, y) - \text{p\_mean})^2 \qquad \text{[Expression 1]}$$

Here, BLK is a total number of pixels in a coding block, and p_mean is an average value of pixels in a block.

In addition, it is also possible to calculate the absolute value of the differences between a pixel in a coding block and pixels, which are adjacent to the pixel in horizontal and vertical directions, and to take a total sum in the block, without being limited to the variance described above. Also in this case, the total sum is small when a picture is flat and is large in a complex design portion with many edges. Therefore, this can be used as an activity. This is calculated by the following expression.

$$\text{act} = \sum_{x,y}^{BLK} (|p(x, y) - p(x+1, y)| + |p(x, y) - p(x, y+1)|) \qquad \text{[Expression 2]}$$

The activity act calculated in this manner is supplied to the quantization parameter calculation unit 110.

Next, code amount control will be described. In the moving picture coding device 100 of the present embodiment, a unit for realizing the code amount control is not provided in particular. In the code amount control, however, a quantization parameter of the coding block is determined based on the amount of generated code. Therefore, the following explanation will be given on the assumption that the quantization parameter calculation unit 110 has the function.

The code amount control is intended to match the amount of generated code of a predetermined unit, such as a frame, near the target code amount. When it is determined that the amount of generated code of the coded block is larger than the target code amount, relatively rough quantization is applied to blocks to be coded subsequently. When it is determined that the amount of generated code of the coded block is smaller than the target code amount, relatively fine quantization is applied to blocks to be coded subsequently.

Figure 3:
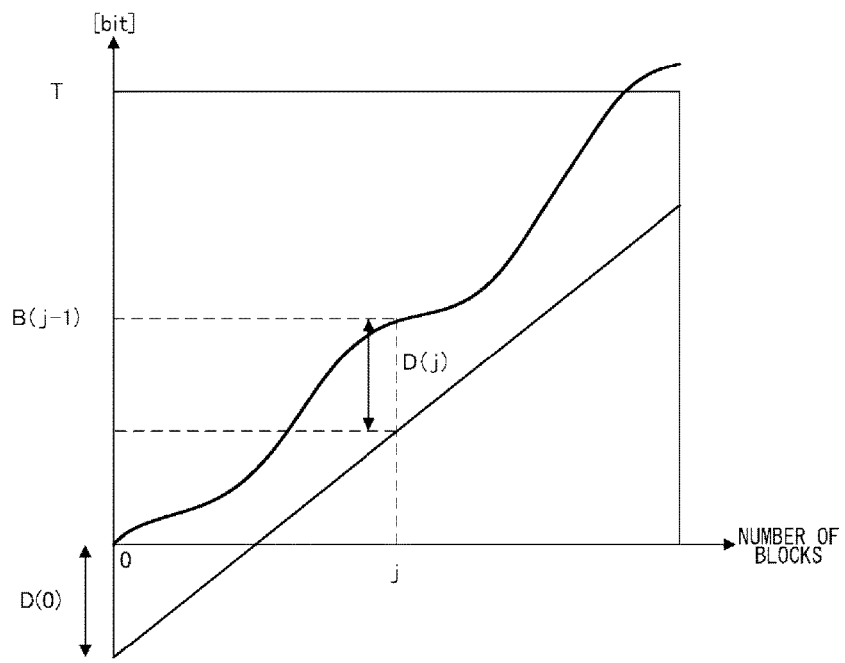
FIG. 3 is a diagram for explaining the code amount control in a screen of MPEG-2 TM5.

The algorithm of the specific code amount control will be described with reference to FIG. 3.

First, a target code amount (T) is determined for each frame. In general, T is determined such that the relationship of I picture>P picture>reference B picture>non-reference B picture is satisfied. For example, when the target bit rate of a moving picture is 5 Mbps and the number of I pictures per second, the number of P pictures per second, the number of reference B pictures per second, and the number of non-reference B pictures per second are 1, 3, 11, and 15, respectively, assuming that the target code amount according to the picture type is Ti, Tp, Tbr, and Tb, Ti=400 kbit, Tp=300 kbit, Tbr=200 kbit, and Tb=100 kbit are set in order to control the target code amount so that the ratio of Ti:Tp:Tbr:Tb=4:3:2:1 is satisfied. However, the assigned code amount according to the picture type does not influence the essence of the present invention.

Next, code amount control in a frame will be described. Assuming that the number of blocks that are units to determine the quantization parameter is N, a generated code amount is B, and a difference bit from the target code amount is D, the following expression is satisfied.

$$D(j) = D(0) + B(j-1) - \frac{T(j-1)}{N} \qquad \text{[Expression 3]}$$

Here, j is a coding sequence count number of a coding block. D(0) is an initial value of a target code amount difference.

A quantization parameter bQP by the code amount control is determined as follows.

$$bQP(j) = D(j) \times r \qquad \text{[Expression 4]}$$

Here, r is a proportionality coefficient to convert a target code amount difference into a quantization parameter. The proportionality coefficient r is determined according to the available quantization parameter.

The quantization parameter calculation unit 110 changes the quantization parameter of the coding block calculated by the code amount control, using the activity act calculated for each coding block by the activity calculation unit 109. Since the quantization parameter is calculated for each coding block, the quantization parameter will be expressed as bQP hereinbelow by omitting the coding sequence count number of the quantization parameter by the code amount control.

The quantization parameter calculation unit 110 records an average activity in a frame coded last as avg_act, and calculates a normalization activity Nact of a coding block using the following expression.

$$Nact = \frac{2 \times act + avg\_act}{act + 2 \times avg\_act} \qquad \text{[Expression 5]}$$

Here, the coefficient 2 in the above expression is a value indicating the dynamic range of the quantization parameter, and the normalization activity Nact having a range of 0.5 to 2.0 is calculated.

In addition, for avg_act, an activity may be calculated in advance for all blocks in a frame before the coding process, and the average value may be set as avg_act. In addition, avc_act may be stored in the coding information storage memory 113, and the quantization parameter calculation unit 110 may derive avg_act from the coding information storage memory 113 when necessary.

By multiplying the calculated normalization activity Nact by the quantization parameter bQP as a reference as in the following expression, a quantization parameter QP of the coding block is obtained.

$$QP = Nact \times bQP \qquad \text{[Expression 6]}$$

In addition, although bQP is a quantization parameter of a block unit calculated by the code amount control as described above, it is also possible to use a quantization parameter representing a slice or a frame including a coding block as a fixed value. In addition, an average quantization parameter of a frame coded last may be used, and the calculation method is not limited in particular in the present embodiment.

The quantization parameter of the coding block calculated in this manner is supplied to the coding information storage memory 113 and the differential quantization parameter generation unit 111.

In the coding information storage memory 113, not only the quantization parameter calculated by the quantization parameter calculation unit 110 and the quantization parameter of the past coding block that is already coded but also coding information, such as a motion vector or a prediction mode to be coded, of the coding block, is stored. Each unit derives the coding information when necessary.

The predictive quantization parameter deriving unit 114 derives a predictive quantization parameter for coding and transmitting the quantization parameter of a coding block efficiently using the coding information or quantization parameters of neighboring coded blocks around a block to be coded from the coding information storage memory 113.

Figure 4:
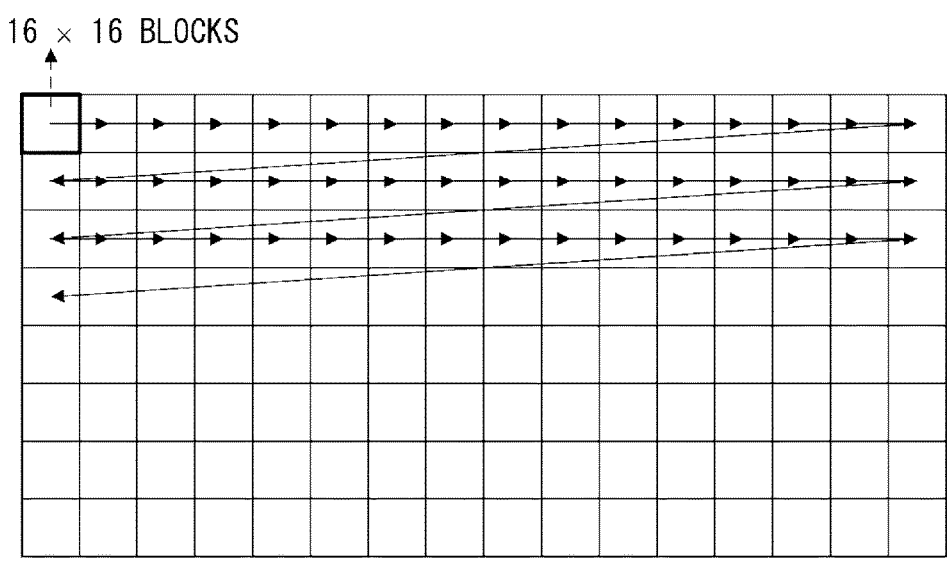
FIG. 4 is a diagram showing a quantization parameter prediction method of H.264.

In order to code and transmit a quantization parameter efficiently, it is more efficient to take a difference (differential quantization parameter) between the quantization parameter and a quantization parameter of a coded block and code and transmit the differential quantization parameter rather than coding the quantization parameter as it is. From the point of view of code amount control, assuming that the quantization parameter of the last coded block in the coding sequence is a predictive quantization parameter, the value of the differential quantization parameter to be transmitted is reduced, and the code amount is reduced. On the other hand, from the point of view of adaptive quantization, since a coding block and neighboring blocks around the coding block are adjacent to each other, the designs are the same or alike in many cases. For this reason, the activity of a block adjacent to the coding block has a value close to the activity of the coding block. Accordingly, assuming that the quantization parameter of the neighboring block is a predictive quantization parameter, the value of the differential quantization parameter to be transmitted is reduced, and the code amount is reduced. For this reason, in H.264, as shown in FIG. 4, a method of coding and transmitting the differential quantization parameter is adopted in which a unit for transmission of the quantization parameter is fixed to a macroblock (a group of 16×16 pixels), a quantization parameter of a block adjacent to the left coded before or immediately before a coding block in raster scan order is set as a predictive quantization parameter, and a difference between the quantization parameter of the coding block and the predictive quantization parameter is taken. That is, H.264 is optimized for quantization parameter prediction when the code amount control is assumed. In H.264, however, hierarchical tree coding, which will be described later, is not performed. In this case, except for the left end of the picture, the last block is a left block. Accordingly, since a quantization parameter of a neighboring block is used as a predictive quantization parameter, it can also be said that H.264 is approximately optimized for the prediction when the adaptive quantization is assumed. For this reason, as in H.264, in the case of a configuration in which a unit for transmission of the quantization parameter is fixed and hierarchical tree coding is not performed, it can be said that the last coded block is an optimal block for quantization parameter prediction.

However, when hierarchical tree coding is performed, using the quantization parameter of the last block as a predictive quantization parameter as in H.264 is optimal for the code amount control. However, when transmitting the quantization parameter using the adaptive quantization, an optimal predictive value is not obtained. Therefore, a problem that the code amount of the differential quantization parameter is increased occurs.

Here, the hierarchical tree coding will be described. The hierarchical tree coding referred to herein is to determine the depth indicating the coding unit in units of a tree block (here, 64×64 blocks) and perform coding in units of a coding block using the determined depth. In this manner, since it is possible to determine the optimal depth depending on the definition of the picture, it is possible to greatly improve the coding efficiency.

Figure 5:
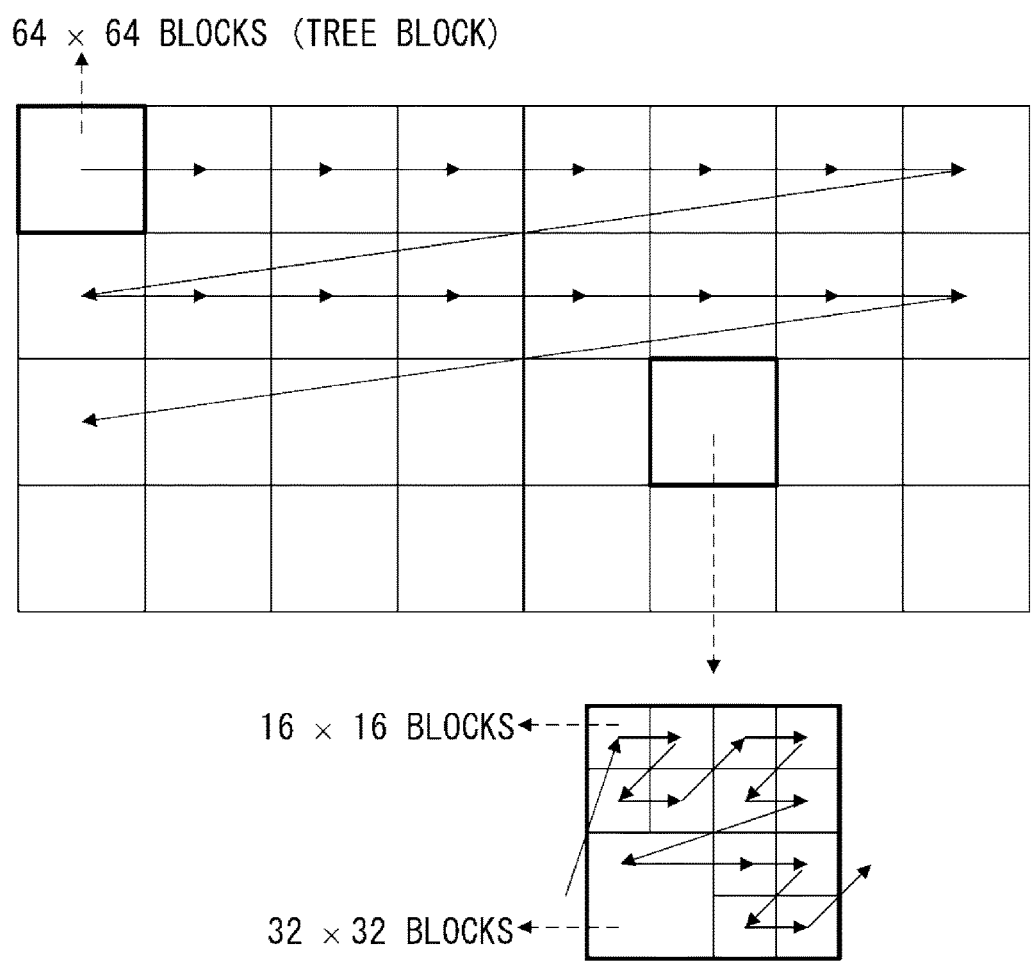
FIG. 5 is a diagram showing an example of the coding sequence when hierarchical tree coding is used.

FIG. 5 shows the coding sequence of the hierarchical tree coding structure. As shown in the upper diagram of FIG. 5, the screen is equally partitioned into square units of the same predetermined size. This unit is called a tree block, and is set as a basic unit of address management for specifying a coding/decoding block in a picture. According to the texture or the like in a picture, in order to optimize the coding process, the tree block can be made to be blocks with a smaller block size by hierarchically partitioning the tree block into four blocks when necessary. The hierarchical block structure obtained by partitioning a block into small blocks as described above is called a tree block structure, and the partitioned block is called a coding block (CU: Coding Unit) and is set as a basic processing unit when performing coding and decoding. The lower diagram of FIG. 5 is an example in which a tree block is partitioned into four CUs and each of the three CUs excluding the lower left CU is further partitioned into four parts. In the present embodiment, it is assumed that the quantization parameter is set in units of a CU. The tree block is also a coding block of the maximum size.

Figure 6:
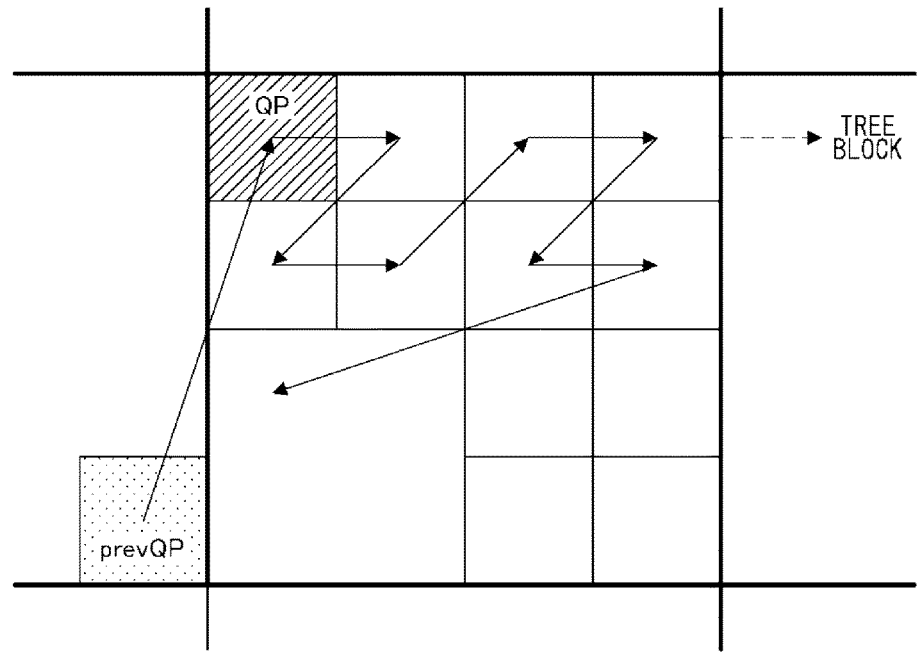
FIG. 6 is a diagram showing the prediction of a quantization parameter of an upper left coding block in a tree block partitioned by the hierarchical tree coding.
Figure 7:
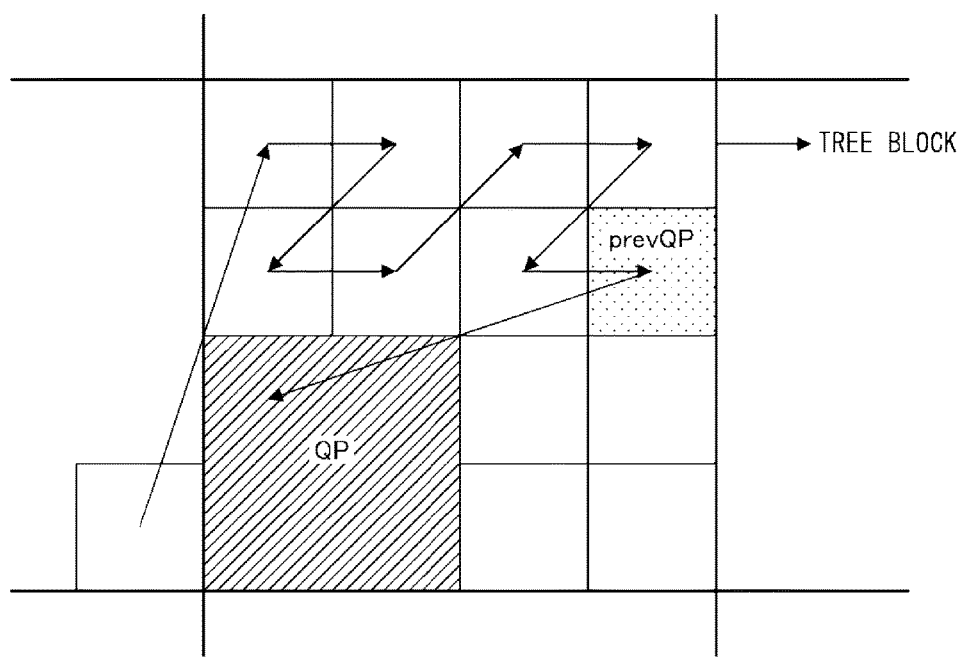
FIG. 7 is a diagram showing an example of the coding sequence in a tree block partitioned by the hierarchical tree coding.

In such hierarchical tree coding, since the coding sequence is different from the raster scan order (left to right) as in H.264 of FIG. 4, the quantization parameter of the last coded block and the quantization parameter of the left neighboring block may be different. For example, as an example of the hierarchical tree coding, as shown in FIG. 6, an upper left coding block (hatched rectangle in FIG. 6) in a tree block to be coded uses a quantization parameter of a lower right coded block (gray rectangle in FIG. 6) coded last, among partitioned blocks of a tree block adjacent to the left, for prediction. In addition, as shown in FIG. 7, a lower left coding block (hatched rectangle in FIG. 7) in a tree block to be coded uses a quantization parameter of a block (gray rectangle in FIG. 7), which is partitioned in the same tree block and is coded last, for prediction. For this reason, simply by predicting the quantization parameter from the last coded block, prediction optimized for the code amount control can be performed, but prediction suitable for the adaptive quantization cannot be performed since the distance between blocks is increased due to partition. Therefore, since the code amount of the differential quantization parameter is increased, coding efficiency is reduced.

Figure 8:
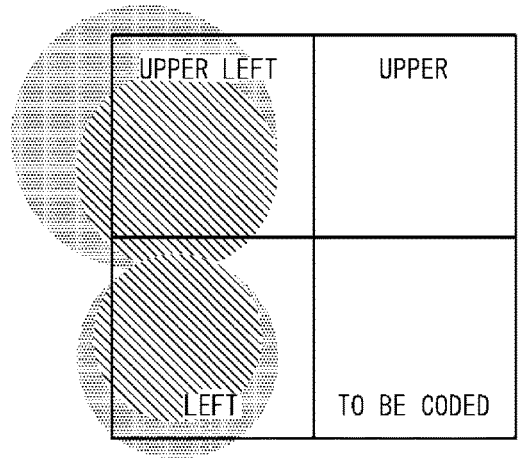
FIG. 8 is a diagram showing an example in which, for a coding block to be coded and neighboring coded blocks adjacent to the coding block, designs are included in the left block and the upper left block.

In addition, if the quantization parameter of a block adjacent to the left is uniformly set as a predictive quantization parameter as in H.264, for example, in the case shown in FIG. 8, this affects each quantization parameter since the design of the picture of the coding block is different from the design of the picture of the left neighboring block. In this case, since the differential quantization parameter becomes a large value, the amount of generated code is also increased. Therefore, there is a possibility that efficient coding and transmission cannot be performed.

As a solution, a method can be considered in which the predictive quantization parameter is not selected uniformly from the left neighboring block but the quantization parameter of an upper neighboring coded block is set as a predictive quantization parameter.

Figure 9:
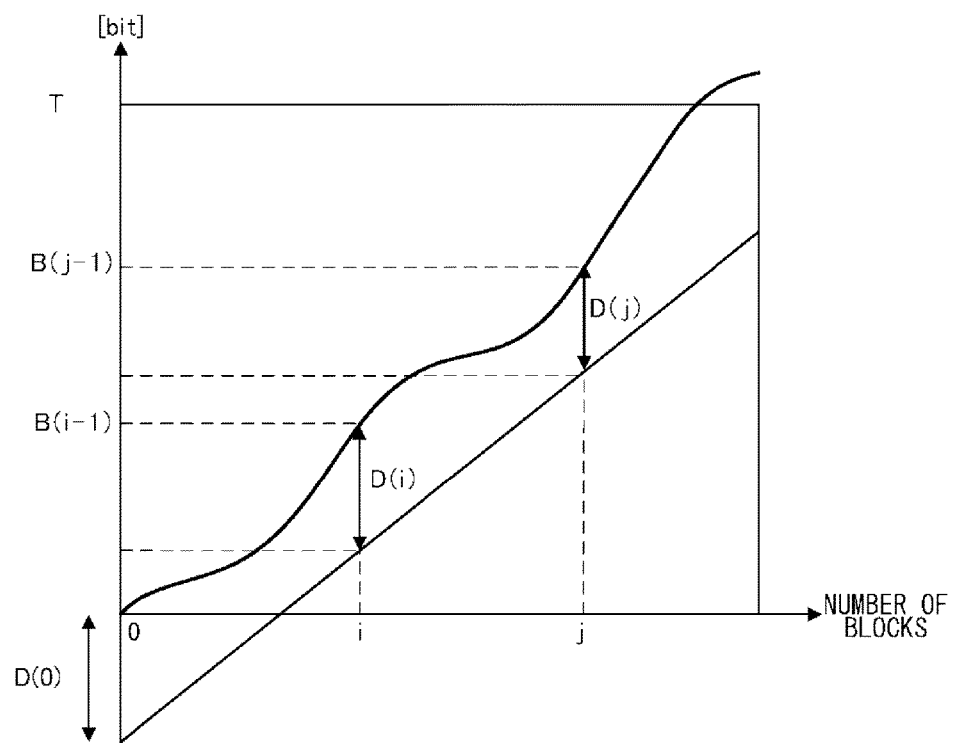
FIG. 9 is a diagram for explaining the positions of coding blocks adjacent to the top and bottom in the code amount control in the screen of MPEG-2 TM5.

However, when predicting the quantization parameter from the upper neighboring block beyond the tree block boundary, if the calculation of the quantization parameter based on the code amount control is taken into consideration, the upper neighboring block is a quantization parameter that is calculated at the considerably past point in time from the coding block. In this case, as shown in FIG. 9, the relationship between the processing order i of the upper neighboring block and the processing order j of the coding block is i<<j in terms of coding order, even if the upper neighboring block and the coding block are adjacent to each other in a picture. Therefore, from the point of view of code amount control, it cannot be said that the correlation between the quantization parameter of the coding block and the quantization parameter of the upper neighboring block is necessarily high.

When performing parallel processing for each tree block slice to increase the speed of the decoding process, the quantization parameter of the upper neighboring block beyond the tree block boundary cannot be used for prediction. In this case, efficient coding and transmission may not be performed by referring to the upper neighboring block beyond the tree block boundary.

Therefore, the predictive quantization parameter deriving unit 114 according to the embodiment of the present invention derives an optimal predictive quantization parameter from neighboring coded blocks without using neighboring blocks of the tree block adjacent to the top of the coding block for quantization parameter prediction, thereby improving the efficiency of the amount of generated code of the differential quantization parameter.

The predictive quantization parameter deriving unit 114 derives a predictive quantization parameter from the position of a coding block and the quantization parameters of neighboring coded blocks around the coding block, which are supplied from the coding information storage memory 113. The details of the predictive quantization parameter deriving unit 114 will be described in embodiments below.

The differential quantization parameter generation unit 111 calculates a differential quantization parameter by subtracting the predictive quantization parameter derived by the predictive quantization parameter deriving unit 114 from the quantization parameter of the coding block calculated by the quantization parameter calculation unit 110. Also at the time of decoding, the predictive quantization parameter is derived in the same manner as at the time of coding from the neighboring decoded block. Therefore, by setting the differential coding parameter as a coding target, it is possible to reduce the code amount of the quantization parameter without inconsistency in coding and decoding. The calculated differential quantization parameter is supplied to the first bitstream generation unit 112.

The first bitstream generation unit 112 generates a first bitstream by entropy-coding the differential quantization parameter calculated by the differential quantization parameter generation unit 111 according to the defined syntax rules. FIG. 10 shows an example of a coding translation table used for the entropy coding of the differential quantization parameter. This is a table called the signed exponential-Golomb coding, and a shorter code length is given as the absolute value of the differential quantization parameter becomes smaller. In general, when a picture is partitioned into blocks, neighboring blocks have similar pictures. Therefore, the activities are close values, and calculated quantization parameters of the blocks are also close values. For this reason, 0 is the highest frequency of occurrence of the differential quantization parameter, and the frequency of occurrence of the differential quantization parameter tends to decrease as the absolute value increases. Also in the table shown in FIG. 10, a short code length is assigned for the value of high frequency of occurrence reflecting the features. If the predictive quantization parameter is predicted to be a value close to the quantization parameter of a coding block, a differential quantization parameter close to 0 is calculated. Accordingly, it is possible to suppress the amount of generated code. The first bitstream generation unit 112 extracts a code bitstream corresponding to the differential quantization parameter from the table shown in FIG. 10, and supplies the code bitstream to the bitstream multiplexing unit 115.

The operation of each unit of the various units 220 surrounded by the thick dotted line in the moving picture decoding device 200 corresponding to the moving picture coding device 100 of the present embodiment described above will be described.

In the various units 220, the differential quantization parameter decoded by the first bitstream decoding unit 202 is first supplied to the quantization parameter generation unit 203. In addition, coding information other than the differential quantization parameter is stored in the coding information storage memory 204 when necessary.

The quantization parameter generation unit 203 calculates a quantization parameter of a decoding block by adding the differential quantization parameter supplied from the first bit stream decoding unit 202 and the quantization parameter derived by the predictive quantization parameter deriving unit 205, and supplies the quantization parameter to the inverse quantization and inverse orthogonal transform unit 207 and the coding information storage memory 204.

The coding information storage memory 204 stores the quantization parameter of the decoded block. In addition, not only the coding information of the block unit decoded by the first bitstream decoding unit 202 but also coding information generated in units of a picture or a slice is stored when necessary.

The predictive quantization parameter deriving unit 205 derives a predictive quantization parameter using the coding information or the quantization parameters of decoded blocks adjacent to the decoding block, and supplies the predictive quantization parameter to the quantization parameter generation unit 203. The quantization parameter calculated by the quantization parameter generation unit 203 is stored in the coding information storage memory 204. When deriving a predictive quantization parameter of the next decoding block, neighboring decoded blocks located around the decoding block are determined, and the quantization parameters of the neighboring blocks are derived from the coding information storage memory 204. The quantization parameters of the neighboring decoded blocks obtained in this manner are the same as the quantization parameters that the predictive quantization parameter deriving unit 114 of the moving picture coding device 100 derives from the coding information storage memory 113. Since the predictive quantization parameter deriving unit 205 has the same function as the predictive quantization parameter deriving unit 114 of the moving picture coding device 100, the same predictive quantization parameter as at the time of coding is derived if the quantization parameters of neighboring blocks supplied from the coding information storage memory 204 are the same.

In the predictive quantization parameter deriving unit 205, the same process is performed except for changing the neighboring coded blocks to the neighboring decoded blocks. Accordingly, explanation of quantization parameter prediction will be omitted.

Thus, the predictive quantization parameter derived on the coding side is also derived consistently on the decoding side.

In the present embodiment, when deriving a predictive quantization parameter, neighboring blocks referred to by the predictive quantization parameter deriving unit 114 of the moving picture coding device 100 are coded blocks, and neighboring blocks referred to by the predictive quantization parameter deriving unit 205 of the moving picture decoding device 200 are decoded blocks. The coded block referred to on the coding side is a block that is locally decoded for the next coding in the coding, and is the same as the decoded block referred to on the decoding side. Therefore, the functions of the predictive quantization parameter deriving units 114 and 205 are the same, and the predictive quantization parameters derived by the predictive quantization parameter deriving units 114 and 205 are also the same. In the following embodiments, the derivation of a predictive quantization parameter on the coding side will be described as a common function without distinction of coding and decoding.

Hereinafter, the details of a method of deriving a predictive quantization parameter performed in common by the predictive quantization parameter deriving units 114 and 205 will be described.

First Embodiment

The detailed operation of the predictive quantization parameter deriving unit 114 in a first embodiment will be described. In the first embodiment, when a coding block to be coded is adjacent to an upper tree block, using the quantization parameter of a coded block in the upper tree block, which is the considerably past block in coding order, for prediction is prohibited. However, the quantization parameter of a coded block of a tree block adjacent to the left, which is the past block in coding order but is not the past block as the upper tree block, is used for prediction.

Figure 11:
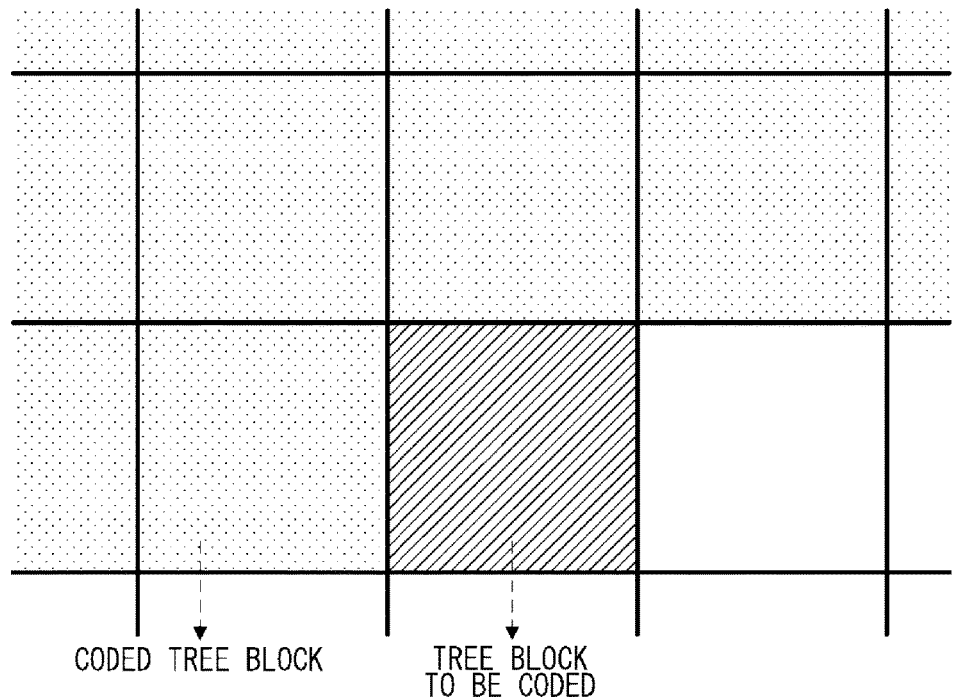
FIG. 11 is a diagram showing the relationship between a tree block to be coded and a coded tree block.

As shown in FIG. 11, coding is performed in raster scan order from the upper left to the lower right of the screen in units of a tree block. A tree block to be coded is shown as a hatched rectangle in FIG. 11, and a coded tree block is shown as a gray portion in FIG. 11. Since hierarchical tree coding is performed according to the coding conditions in a tree block, a coding block is partitioned into parts having a size smaller than or equal to the tree block. Accordingly, a coding block in a tree block to be coded and a coded block in the upper tree block are adjacent to each other but are largely separated from each other in the coding sequence. For this reason, since the quantization parameter calculated by the code amount control is calculated in the coding sequence, it cannot be said that the quantization parameter of the coding block and the quantization parameter of the coded block in the upper tree block have close values. Therefore, in the first embodiment, the upper tree block is not used for quantization parameter prediction, and only the left tree block that is close in the coding sequence is used.

Figure 12:
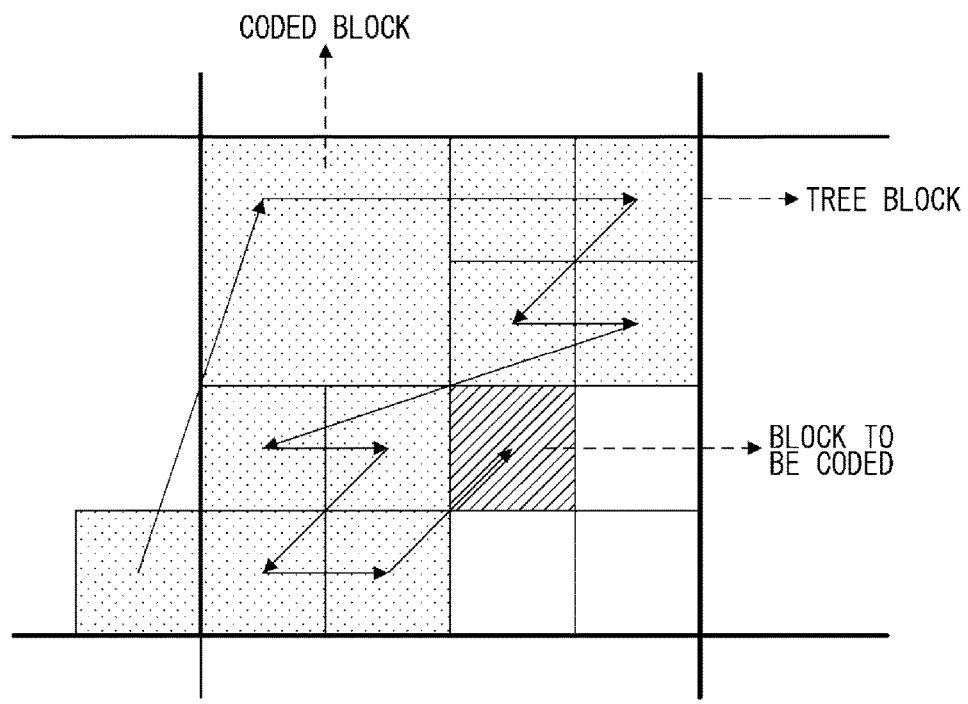
FIG. 12 is a diagram showing the relationship between a coded block and a coding block in a tree block partitioned by the hierarchical tree coding.

In addition, as shown in FIG. 12, assuming that the hatched rectangle shown in FIG. 12 is a coding block in a tree block, the thin solid line indicates a coding sequence, and blocks coded before the coding block are shown as gray portions in FIG. 12. In the same tree block, a coding block and a coded block are not separated from each other in terms of the coding sequence, and the designs are the same or alike in many cases. Therefore, in the same tree block, it is effective to use the quantization parameter of the upper coded block for prediction. In the first embodiment, neighboring coded blocks are preferentially used for prediction rather than coded blocks that are close in the coding sequence.

Figure 13:
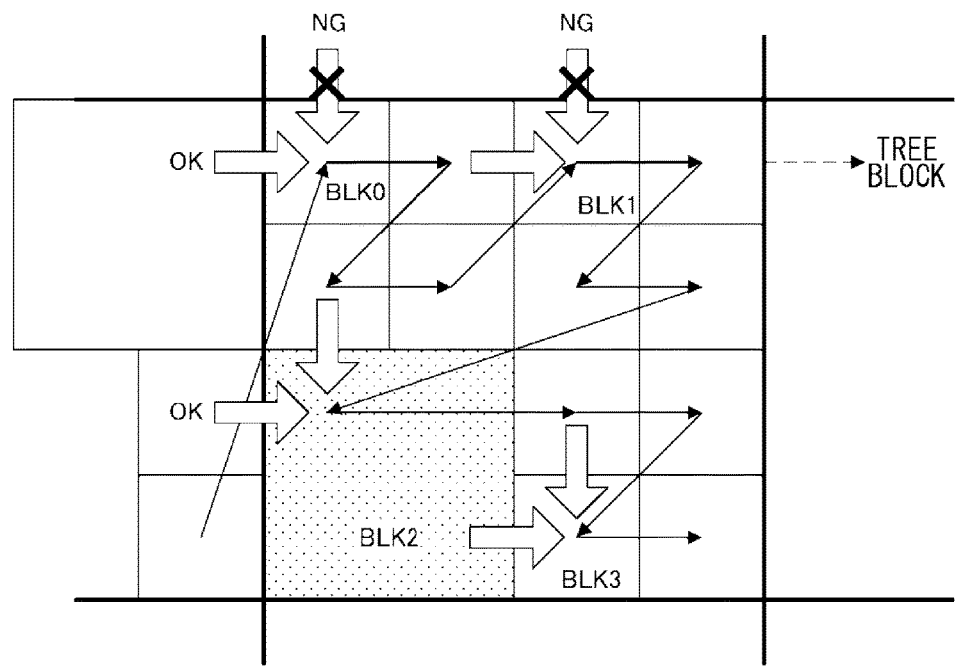
FIG. 13 is a diagram showing the reference of a predictive quantization parameter of a coding block in a first embodiment.

In FIG. 13, the direction of a coded block referred to by each coding block in a partitioned tree block is shown by the thick arrow. In FIG. 13, the thin solid line indicates a coding sequence, and a coding block gives priority to a neighboring coded block over a coded block that is close to the coding block in the coding sequence. BLK0 and BLK1 that are located at the upper end of the tree block in FIG. 13 border the upper tree block. Accordingly, the quantization parameter of the coded block adjacent to the top is not used for prediction, and only the quantization parameter of the coded block adjacent to the left is used. In BLK2 and BLK3, coded blocks adjacent to the top are present in the same tree block. Accordingly, the quantization parameter of the upper coded block and the quantization parameter of the left coded block are used for prediction.

Figure 14:
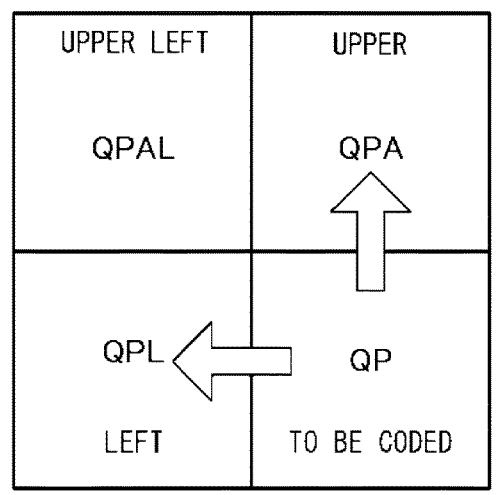
FIG. 14 is a diagram showing an example in which the quantization parameter of a neighboring coded block is shown as a reference as a predictive quantization parameter of a coding block.

FIG. 14 shows the arrangement of a coding block and neighboring coded blocks that are defined in the present embodiment. In the present embodiment, for convenience of explanation, the respective blocks are shown to have the same size. However, for example, even when performing optimal motion prediction by changing the block size in motion prediction or the like, the above can be realized by setting the upper left point of a coding block as a reference and selecting blocks adjacent to the coding block.

The symbol QPx (x=L, A, AL) described in FIG. 14 indicates a quantization parameter of a neighboring coded block. The predictive quantization parameter deriving unit 114 determines a predictive quantization parameter according to the presence of quantization parameters of the left and upper neighboring blocks shown in FIG. 14.

Figure 15:
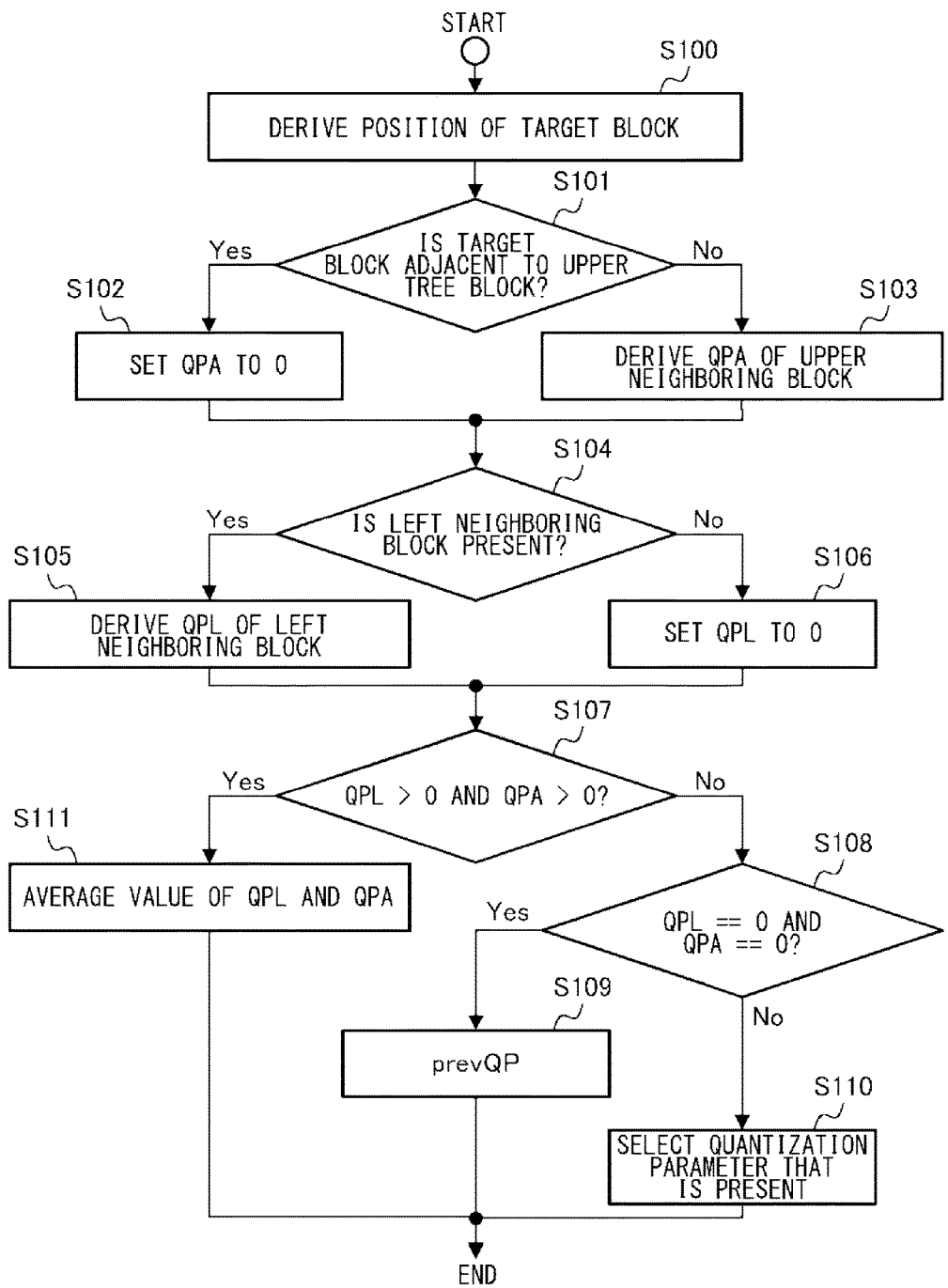
FIG. 15 is a flowchart for explaining the operation of a predictive quantization parameter deriving unit of the first embodiment.

The operation of the predictive quantization parameter deriving unit 114 will be described. FIG. 15 is a flowchart showing the operation of the predictive quantization parameter deriving unit 114 in the first embodiment.

First, position information of a coding block to be coded is derived (S100). For the position information of the coding block, the upper left position of a tree block including the coding block is calculated with the upper left of the screen as a base point, and the position of the coding block is calculated from the upper left position of the tree block. Then, it is determined whether or not the coding block is adjacent to the upper tree block (S101).

When the coding block is adjacent to the upper tree block (Yes in S101), that is, when the coding block is located at the upper end of the tree block, the upper neighboring block is included in the upper tree block. Accordingly, since the upper neighboring block is beyond the tree block boundary, the upper neighboring block is not used for quantization parameter prediction. Here, noting that the quantization parameter always has a positive value, a quantization parameter QPA of the upper neighboring block is set to 0 when the upper neighboring block is not used (S102).

On the other hand, when the coding block is not adjacent to the upper tree block (No in S101), that is, when the upper neighboring block is located in the same tree block as the coding block, the storage region stored in the coding information storage memory 113 is accessed from the reference position information of the upper left of the coding block, and the quantization parameter QPA of the upper neighboring block is supplied to the predictive quantization parameter deriving unit 114 (S103).

Then, it is determined whether or not there is a coded block adjacent to the left of the coding block (S104). When there is a block adjacent to the left (Yes in S104), the storage region stored in the coding information storage memory 113 is accessed from the reference position information of the upper left of the coding block, and a quantization parameter QPL of the left neighboring block is supplied to the predictive quantization parameter deriving unit 114 (S105). When there is no left neighboring block (No in S104), the quantization parameter QPL of the left neighboring block is set to 0 (S106).

Then, it is determined whether or not both the quantization parameters of the left and upper neighboring blocks are positive (S107). When both the quantization parameters of the left and upper neighboring blocks are positive (Yes in S107), both the left and upper neighboring blocks are present. Accordingly, the average value of the quantization parameters of the left and upper neighboring blocks is set as a predictive quantization parameter (S111). On the other hand, when neither of the quantization parameters of the left and upper neighboring blocks is positive (No in S107), that is, when the quantization parameter of at least one of the left and upper neighboring blocks is 0, at least one of the left and upper neighboring blocks is not present. In this case, the process proceeds to S108.

Then, it is determined whether or not both the quantization parameters of the left and upper neighboring blocks are 0 (S108). That is, when both the quantization parameters of the left and upper neighboring blocks are 0, neither of the left and upper neighboring blocks is present. Accordingly, it is not possible to refer to the quantization parameters of the left and upper neighboring blocks as predictive quantization parameters. Therefore, a quantization parameter (prevQP) of a block coded before or immediately before a coding block to be coded, is set as a predictive quantization parameter. In addition, when the block at the upper left end of a picture is a coding block, left and upper neighboring blocks and a block coded before or immediately before the coding block to be coded are not present. Accordingly, the quantization parameter of a picture or a slice is set as a predictive quantization parameter (S109). When either the left neighboring block or the upper neighboring block is present, one of the quantization parameters that is positive is set as a predictive quantization parameter (S110). The predictive quantization parameter calculated in this manner is supplied to the differential quantization parameter generation unit 111.

In addition, the predictive quantization parameter deriving unit 114 can also determine the predictive quantization parameter from the quantization parameters of the left neighboring block, the upper neighboring block, and the upper left neighboring block around the coding block shown in FIG. 14. The difference from the method described above is that a weighting is given to the quantization parameters of the left and upper neighboring blocks based on the determination of a predictive quantization parameter and the derived value is set as a predictive quantization parameter.

Figure 16:
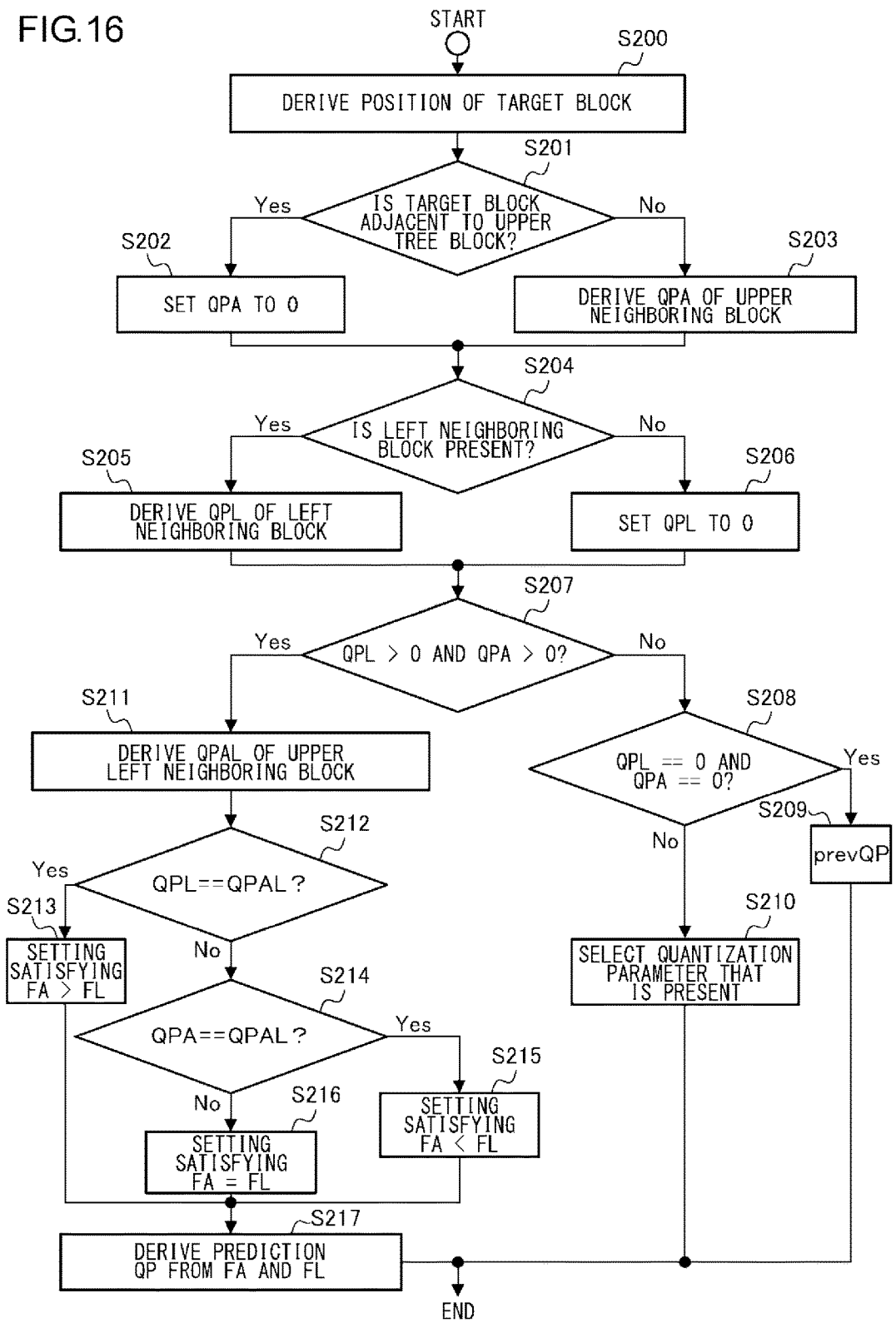
FIG. 16 is a flowchart for explaining another operation of the predictive quantization parameter deriving unit of the first embodiment.

FIG. 16 is a flowchart showing the operation of the predictive quantization parameter deriving unit 114. Since the process of S200 to S210 in the flowchart shown in FIG. 16 is the same as that of S100 to S110 in the flowchart shown in FIG. 15 described above, explanation thereof will be omitted. Accordingly, the following explanation will be given from the case where both the quantization parameters of the left and upper neighboring blocks are positive (Yes in S207) in determination regarding whether or not both the quantization parameters of the left and upper neighboring blocks are positive (S207). When both the quantization parameters of the left and upper neighboring blocks are positive, both the left and upper neighboring blocks are present. In this case, an upper left neighboring block is also present. Accordingly, the storage region stored in the coding information storage memory 113 is accessed from the reference position information of the upper left of the coding block, and a quantization parameter QPAL of the upper left neighboring block is supplied to the predictive quantization parameter deriving unit 114 (S211).

Then, it is determined whether or not the quantization parameter QPL of the left neighboring block matches the quantization parameter QPAL of the upper left neighboring block (S212). When QPL and QPAL match each other, assuming that the weighting factor of the quantization parameter of the upper neighboring block is FA and the weighting factor of the quantization parameter of the left neighboring block is FL, a weighting for the quantization parameter of the upper neighboring block is set to be large so that FA>FL is satisfied (S213). For example, FA is set to 3, and FL is set to 1. In this case, since the arrangement of the quantization parameter shown in FIG. 8 can be considered as an example, it can be said that it is appropriate to set the weighting of the quantization parameter of the upper neighboring block to be large. In addition, even if QPA matches QPL and QPAL, there is no problem since the quantization parameters of all neighboring blocks are the same. When QPL and QPAL do not match each other, the process proceeds to S214 to determine whether or not QPA and QPAL match each other (S214). When QPA and QPAL match each other, a weighting for the quantization parameter of the left neighboring block is set to be large so that FA<FL is satisfied (S215). For example, FA is set to 1, and FL is set to 3. When QPA and QPAL do not match each other, FA and FL are set as the same weighting, and the weighting for the quantization parameters of the left and upper neighboring blocks is equalized (S216). In this case, since all quantization parameters of the left neighboring block, the upper neighboring block, and the upper left neighboring block are different, it is not possible to perform sufficient condition determination to set the weighting of one of QPL and QPA to be large. Therefore, the average of QPL and QPA is set as a predictive quantization parameter, and the same determination value is set. For example, FA is set to 2, and FL is set to 2. A predictive quantization parameter predQP is derived from the determined weighting factor and each quantization parameter using the following expression (S217).

$$predQP = \frac{FA \times QPA + FL \times QPL + 2}{4} \quad \text{[Expression 7]}$$

Here, the denominator of the above expression is FA+FL, and 2 of the numerator is a value of (FA+FL)/2 added for rounding off. The predictive quantization parameter derived in this manner is supplied to the differential quantization parameter generation unit 111.

Instead of the determination regarding whether or not QPL and QPAL are the same in S212 and the determination regarding whether or not QPA and QPAL are the same in S214 that are shown in FIG. 16, a left or upper quantization parameter can also be selected as a predictive quantization parameter by setting the absolute value of the difference between the quantization parameter of the left neighboring block and the quantization parameter of the upper left neighboring block to ΔL and the absolute value of the difference between the quantization parameter of the upper neighboring block and the quantization parameter of the upper left neighboring block to ΔA and comparing ΔL and ΔA with each other.

In a coding block and neighboring coded blocks around the coding block, ΔL indicates the absolute value of the difference between the quantization parameter of the left neighboring block and the quantization parameter of the upper left neighboring block, and ΔA indicates the absolute value of the difference between the quantization parameter of the upper neighboring block and the quantization parameter of the upper left neighboring block. ΔL and ΔA are expressed as the following expressions.

$$\Delta L = |QPL - QPAL| \quad \text{[Expression 8]}$$

$$\Delta A = |QPA - QPAL| \quad \text{[Expression 9]}$$

When ΔA is larger than ΔL, the difference between QPA and QPAL is large. In this case, it is estimated that the smoothness or complexity of pictures between the upper neighboring block and the upper left neighboring block is different from that between the left neighboring block and the upper left neighboring block (change is large). Accordingly, in the coding block and the neighboring coded blocks around the coding block, it is thought that a quantization parameter difference occurs between two left blocks (a left neighboring block and an upper left neighboring block) and two right blocks (a coding block and an upper neighboring block). For this reason, it is determined that the quantization parameter of the coding block is closer to the quantization parameter of the upper neighboring block than to the quantization parameter of the left neighboring block.

In the case of a decoding process, equivalent processing is realized by changing the reference numeral of the predictive quantization parameter deriving unit from 114 to 205 and the reference numeral of the coding information storage memory from 113 to 204 and changing the output destination of the predictive quantization parameter from the differential quantization parameter generation unit 111 to the quantization parameter generation unit 203.

Second Embodiment

The operations of the predictive quantization parameter deriving units 114 and 205 in a second embodiment will be described. Here, a coding process will be described. In the case of a decoding process, however, equivalent processing is realized by changing coding to decoding, changing the reference numeral of the predictive quantization parameter deriving unit from 114 to 205 and the reference numeral of the coding information storage memory from 113 to 204, and changing the output destination of the predictive quantization parameter from the differential quantization parameter generation unit 111 to the quantization parameter generation unit 203. In the second embodiment, quantization parameters of left and upper coded blocks adjacent to the coding block to be coded are used for prediction, as in the first embodiment. On the other hand, the difference from the first embodiment is that, when the coding block is adjacent to the left tree block, using the quantization parameter of a coded block in the left tree block for prediction is prohibited, in the same manner as when the coding block is adjacent to the upper tree block. The reason is as follows. The calculation of the quantization parameter of the coding block is performed based on the coding sequence of the coding control. Accordingly, coding turns between tree blocks become away from each other compared with coding turns within a tree block. In this case, even if coding blocks are adjacent to each other between the tree blocks, the quantization parameters of coding blocks calculated by the code amount control do not necessarily become close values. Accordingly, they may not be suitable as predictive quantization parameters. Therefore, in the second embodiment, when a coding block to be coded or decoded is adjacent to the left or upper tree block, the quantization parameter of a coded block in the left or upper tree block is not used for prediction, and is used after being replaced with the quantization parameter of a block coded before or immediately before the coding block to be coded in coding sequence.

Figure 17:
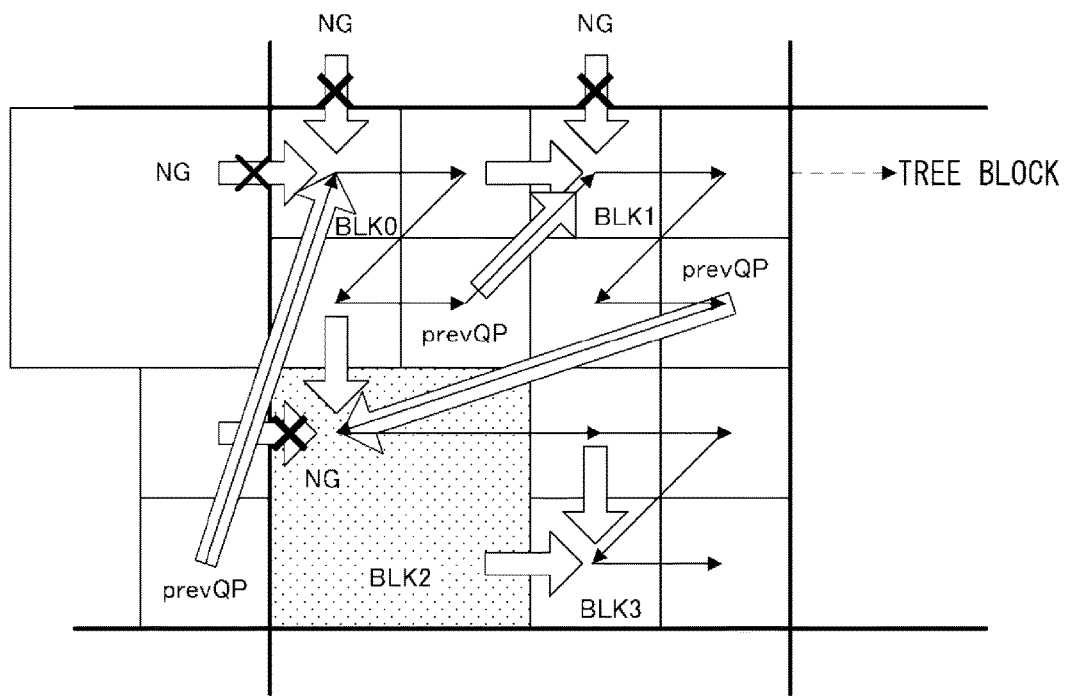
FIG. 17 is a diagram showing the reference of a predictive quantization parameter of a coding block in a second embodiment.

In FIG. 17, the direction of a coded block referred to by each coding block in a partitioned tree block is shown by the thick arrow. In FIG. 17, the thin solid line indicates a coding sequence, and a coding block uses a quantization parameter of a neighboring coded block in a tree block including the coding block in principle. BLK0 located at the upper end of the tree block in FIG. 18 borders left and upper tree blocks. Accordingly, the quantization parameters of blocks coded before or immediately before the coding block to be coded are used for prediction after being replaced with the quantization parameters of coded blocks adjacent to the left and top. BLK1 borders the upper tree block. Accordingly, the quantization parameter of the coded block adjacent to the top is not used for prediction, and is replaced with the quantization parameter of a block coded before or immediately before the coding block to be coded. This quantization parameter is used for prediction together with the quantization parameter of a coded block adjacent to the left. BLK2 borders the left tree block. Accordingly, the quantization parameter of the coded block adjacent to the left is not used for prediction, and is replaced with the quantization parameter of a block coded before or immediately before the coding block to be coded. This quantization parameter is used for prediction together with the quantization parameter of a coded block adjacent to the top. In BLK3, coded blocks adjacent to the left and top are present in the same tree block. Accordingly, the quantization parameter of the upper coded block and the quantization parameter of the left coded block are used for prediction.

Figure 18:
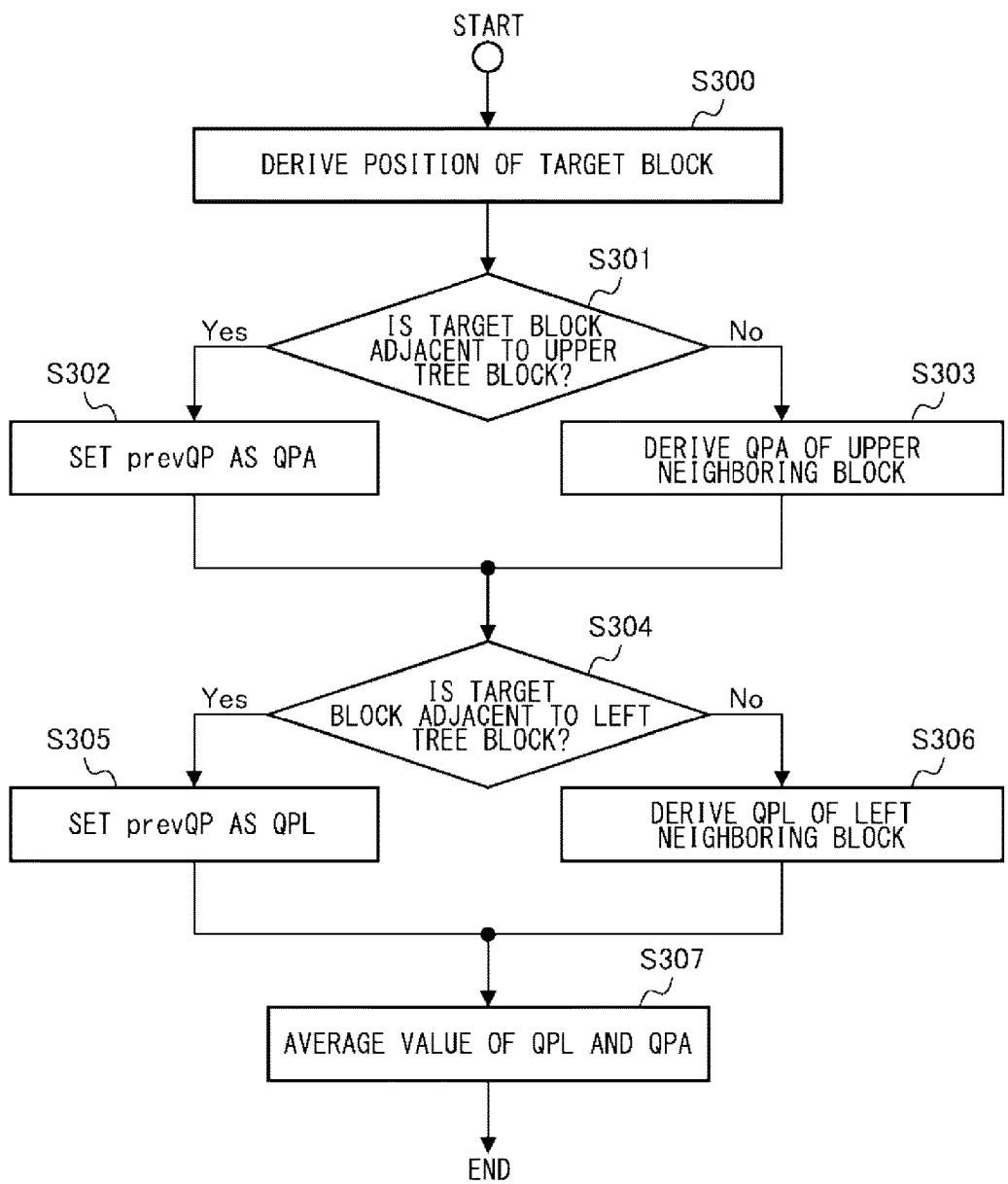
FIG. 18 is a flowchart for explaining the operation of a predictive quantization parameter deriving unit of the second embodiment.

FIG. 18 is a flowchart showing the operation of the predictive quantization parameter deriving unit 114 in the second embodiment.

First, position information of a coding block to be coded is derived (S300). For the position information of the coding block, the upper left position of a tree block including the coding block is calculated with the upper left of the screen as a base point, and the position of the coding block is calculated from the upper left position of the tree block. Then, it is determined whether or not the coding block is adjacent to the upper tree block (S301). When the coding block is adjacent to the upper tree block (Yes in S301), that is, when the coding block is located at the upper end of the tree block, the upper neighboring block is included in the upper tree block. Accordingly, since the upper neighboring block is beyond the tree block boundary, the upper neighboring block is not used for quantization parameter prediction, and the quantization parameter prevQP of a coding block coded before or immediately before the coding block to be coded is set as QPA (S302).

On the other hand, when the coding block is not adjacent to the upper tree block (No in S301), that is, when the upper neighboring block is located in the same tree block as the coding block, the storage region stored in the coding information storage memory 113 is accessed from the reference position information of the upper left of the coding block, and the quantization parameter QPA of the upper neighboring block is supplied to the predictive quantization parameter deriving unit 114 (S303).

Then, it is determined whether or not the coding block is adjacent to the left tree block (S304). When the coding block is adjacent to the left tree block (Yes in S304), that is, when the coding block is located at the left end of the tree block, the left neighboring block is included in the left tree block. Accordingly, since the left neighboring block is beyond the tree block boundary, the left neighboring block is not used for quantization parameter prediction, and the quantization parameter prevQP of a coding block coded before or immediately before the coding block to be coded is set as QPL (S305).

On the other hand, when the coding block is not adjacent to the left tree block (No in S304), that is, when the left neighboring block is located in the same tree block as the coding block, the storage region stored in the coding information storage memory 113 is accessed from the reference position information of the upper left of the coding block, and the quantization parameter QPL of the left neighboring block is supplied to the predictive quantization parameter deriving unit 114 (S306). Finally, the average value of the quantization parameters of the left and upper neighboring blocks is set as a predictive quantization parameter (S307). The predictive quantization parameter calculated in this manner is supplied to the differential quantization parameter generation unit 111.

In the second embodiment, when the left and upper neighboring blocks are beyond the tree block boundary, each quantization parameter serves as a quantization parameter of a coding block coded before or immediately before the coding block to be coded. Therefore, since there is necessarily a non-zero value, it is possible to reduce the amount of processing for determining the value of the quantization parameter more than in the first embodiment.

Third Embodiment

The operations of the predictive quantization parameter deriving units 114 and 205 in a third embodiment will be described. Here, a coding process will be described. In the case of a decoding process, however, equivalent processing is realized by changing coding to decoding, changing the reference numeral of the predictive quantization parameter deriving unit from 114 to 205 and the reference numeral of the coding information storage memory from 113 to 204, and changing the output destination of the predictive quantization parameter from the differential quantization parameter generation unit 111 to the quantization parameter generation unit 203. The difference from the first embodiment is that, when a coding block to be coded or decoded is adjacent to the left tree block, using the quantization parameter of a coded block in the left tree block for prediction is prohibited, in the same manner as when the coding block is adjacent to the upper tree block. That is, using the quantization parameter of a coded block beyond the tree block boundary for prediction is limited to only when in a tree block, a coding block to be first coded in the coding sequence uses the quantization parameters of blocks coded before or immediately before a coding block to be coded.

Figure 19:
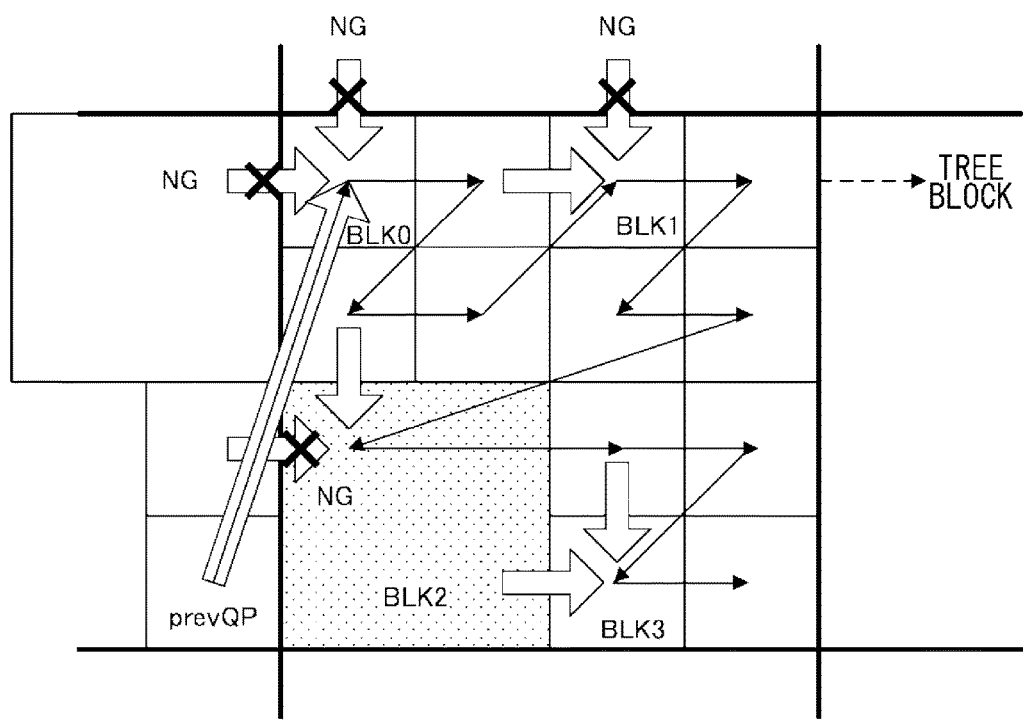
FIG. 19 is a diagram showing the reference of a predictive quantization parameter of a coding block in the second embodiment.

In FIG. 19, the direction of a coded block referred to by each coding block in a partitioned tree block is shown by the thick arrow. In FIG. 19, the thin solid line indicates a coding sequence, and a coding block uses a quantization parameter of a neighboring coded block in a tree block including the coding block.

Since BLK0 located at the upper end of the tree block in FIG. 19 borders left and upper tree blocks, only the quantization parameters of blocks coded before or immediately before the coding block to be coded are used for prediction. BLK1 borders the upper tree block. Accordingly, the quantization parameter of the coded block adjacent to the top is not used for prediction, and only the quantization parameter of the coded block adjacent to the left is used for prediction. BLK2 borders the left tree block. Accordingly, the quantization parameter of the coded block adjacent to the left is not used for prediction, and only the quantization parameter of the coded block adjacent to the top is used for prediction. In BLK3, coded blocks adjacent to the left and top are present in the same tree block. Accordingly, the quantization parameter of the upper coded block and the quantization parameter of the left coded block are used for prediction.

Figure 20:
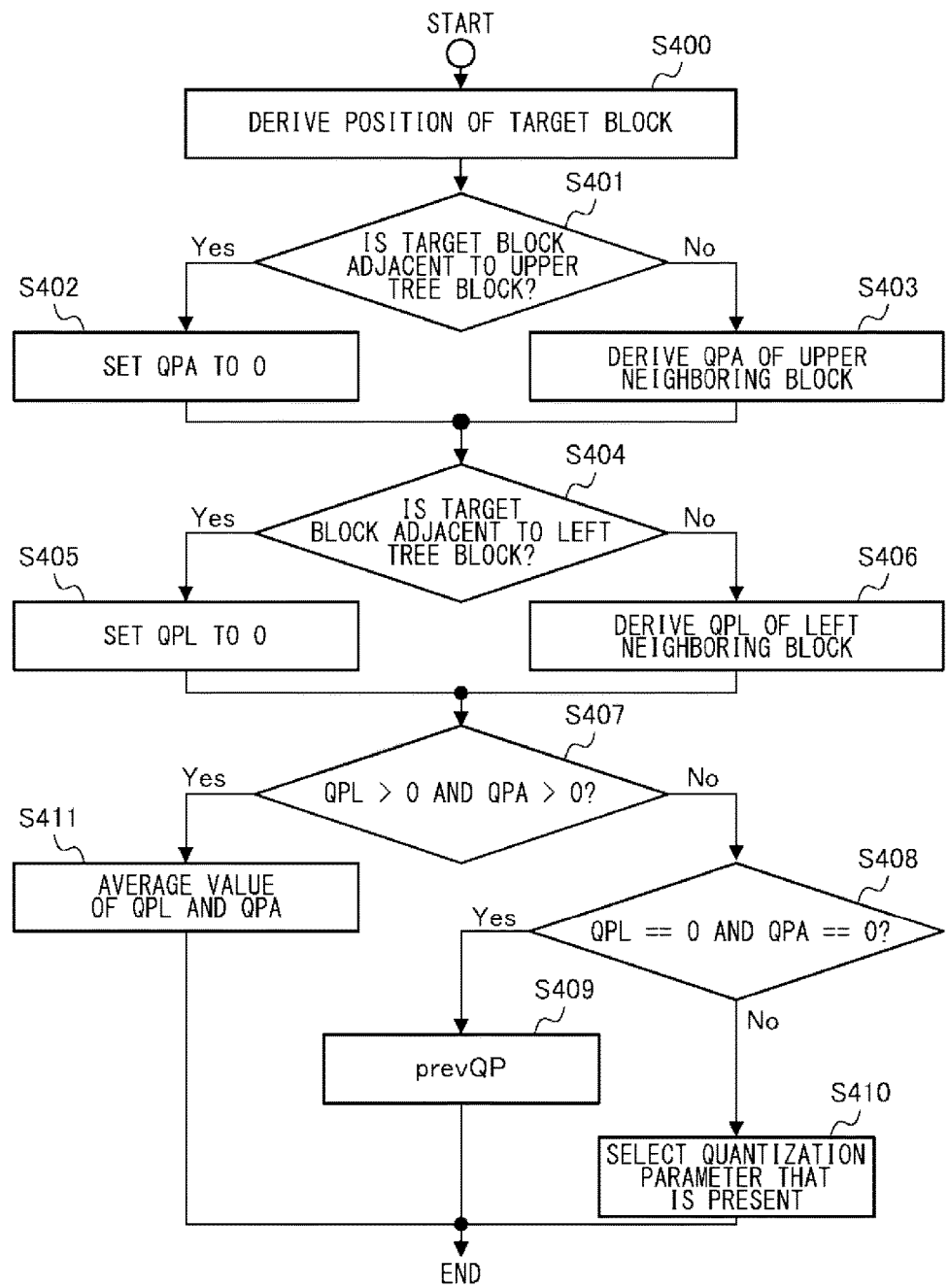
FIG. 20 is a flowchart for explaining the operation of a predictive quantization parameter deriving unit of the second embodiment.

FIG. 20 is a flowchart showing the operation of the predictive quantization parameter deriving unit 114 in the third embodiment. Since S400 to S403 and S407 to S411 in the flowchart shown in FIG. 20 are the same as S100 to S103 and S107 to S111 shown in FIG. 15 in the first embodiment, explanation thereof will be omitted, and only the difference from S404 after it is determined whether or not the coding block is adjacent to the upper tree block will be described.

After determining whether or not the coding block and the upper tree block are adjacent to each other, it is determined whether or not the coding block is adjacent to the left tree block (S404). When the coding block is adjacent to the left tree block (Yes in S404), that is, when the coding block is located at the left end of the tree block, the left neighboring block is included in the left tree block. Accordingly, since the left neighboring block is beyond the tree block boundary, the left neighboring block is not used for quantization parameter prediction. Here, noting that the quantization parameter always has a positive value, the quantization parameter QPL of the left neighboring block is set to 0 when the left neighboring block is not used (S405). On the other hand, when the coding block is not adjacent to the left tree block (No in S404), that is, when the left neighboring block is located in the same tree block as the coding block, the storage region stored in the coding information storage memory 113 is accessed from the reference position information of the upper left of the coding block, and the quantization parameter QPL of the left neighboring block is supplied to the predictive quantization parameter deriving unit 114 (S406). A predictive quantization parameter is derived from the quantization parameters of the left and upper neighboring blocks derived in this manner, and the predictive quantization parameter is supplied to the differential quantization parameter generation unit 111.

Fourth Embodiment

The operations of the predictive quantization parameter deriving units 114 and 205 in a fourth embodiment will be described. Here, a coding process will be described. In the case of a decoding process, however, equivalent processing is realized by changing coding to decoding, changing the reference numeral of the predictive quantization parameter deriving unit from 114 to 205 and the reference numeral of the coding information storage memory from 113 to 204, and changing the output destination of the predictive quantization parameter from the differential quantization parameter generation unit 111 to the quantization parameter generation unit 203. In the fourth embodiment, when a coding block to be coded or decoded is adjacent to the left or upper tree block, using the quantization parameter of a coded block in the left or upper tree block for prediction is prohibited. In principle, the quantization parameter of the coded block adjacent to the left is used for prediction. When a coding block adjacent to the left is not present or is present at a position beyond the tree block boundary, the quantization parameter of a block coded before or immediately before the coding block to be coded is used for prediction.

Figure 21:
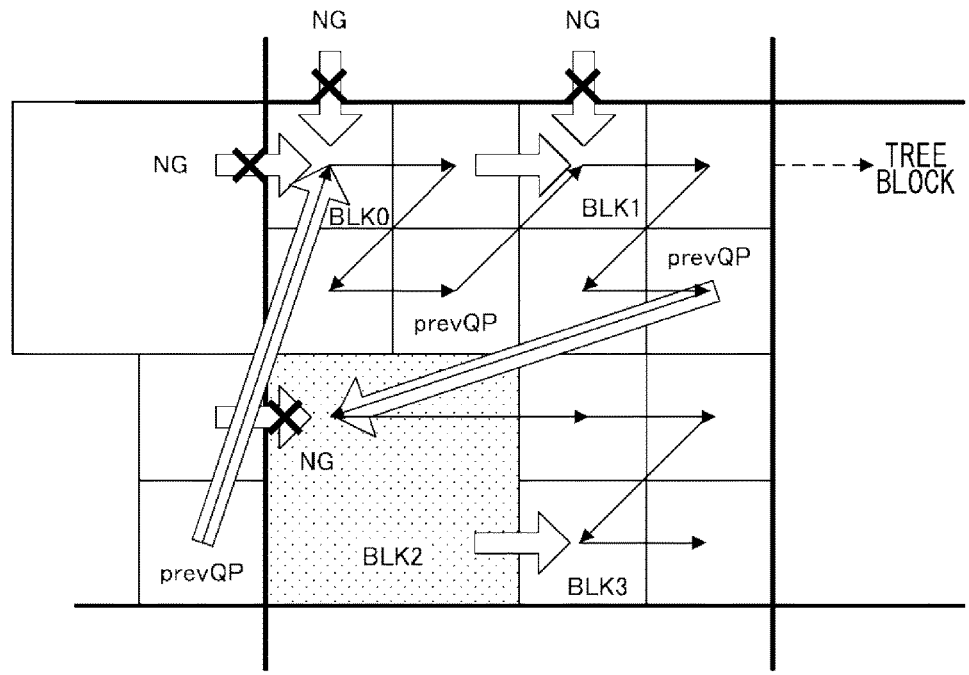
FIG. 21 is a diagram showing the reference of a predictive quantization parameter of a coding block in a third embodiment.

In FIG. 21, the direction of a coded block referred to by each coding block in a partitioned tree block is shown by the thick arrow. In FIG. 21, the thin solid line indicates a coding sequence, and a coding block uses a quantization parameter of a left neighboring coded block in a tree block including the coding block in principle.

Since BLK0 located at the upper end of the tree block in FIG. 21 borders left and upper tree blocks, the quantization parameters of blocks coded before or immediately before the coding block to be coded are used for prediction. In BLK1 and BLK3, a coded block adjacent to the left is present in the same tree block. Accordingly, the quantization parameter of the left coded block is used for prediction. BLK2 borders the left tree block. Accordingly, the quantization parameter of the coded block adjacent to the left is not used for prediction, and the quantization parameter of the block coded before or immediately before the coding block to be coded is used for prediction.

Figure 22:
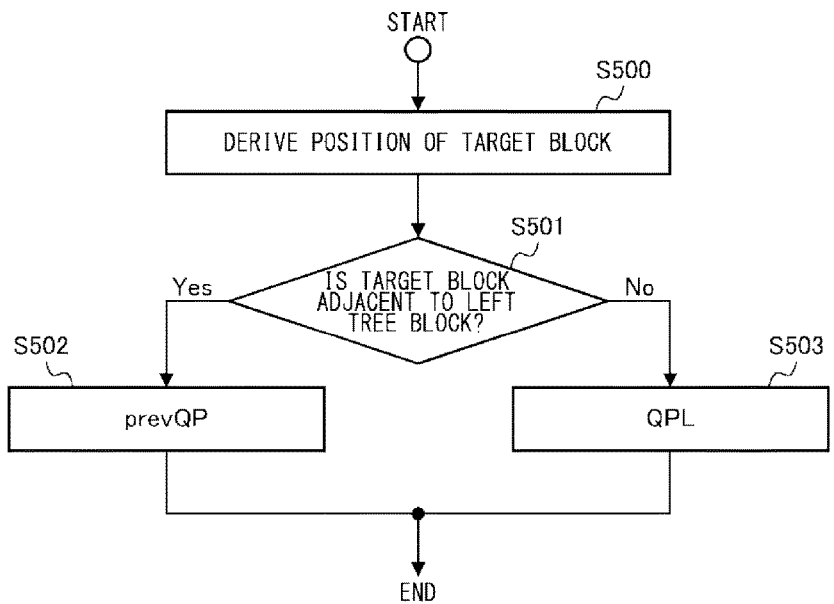
FIG. 22 is a flowchart for explaining the operation of a predictive quantization parameter deriving unit of the third embodiment.

FIG. 22 is a flowchart showing the operation of the predictive quantization parameter deriving unit 114 in the fourth embodiment. First, position information of a coding block to be coded is derived (S500). For the position information of the coding block, the upper left position of a tree block including the coding block is calculated with the upper left of the screen as a base point, and the position of the coding block is calculated from the upper left position of the tree block. Then, it is determined whether or not the coding block is adjacent to the left tree block (S501). When the coding block is adjacent to the left tree block (Yes in S501), that is, when the coding block is located at the left end of the tree block, the left neighboring block is included in the left tree block. Accordingly, since the left neighboring block is beyond the tree block boundary, the left neighboring block is not used for quantization parameter prediction, and the quantization parameter prevQP of the coding block coded before or immediately before the coding block to be coded is set as a predictive quantization parameter (S502). On the other hand, when the coding block is not adjacent to the left tree block (No in S501), that is, when the left neighboring block is located in the same tree block as the coding block, the quantization parameter QPL of the left neighboring block is derived by accessing the storage region stored in the coding information storage memory 113 from the reference position information of the upper left of the coding block, and the quantization parameter QPL is set as a predictive quantization parameter (S503). The predictive quantization parameter derived in this manner is supplied to the differential quantization parameter generation unit 111.

In the fourth embodiment, the quantization parameter of the left neighboring coded block of the coding block is used for prediction in principle. Therefore, since the determination process is simplified compared with the previous embodiments, it is possible to reduce the circuit size.

Fifth Embodiment

The operations of the predictive quantization parameter deriving units 114 and 205 in a fifth embodiment will be described. Here, a coding process will be described. In the case of a decoding process, however, equivalent processing is realized by changing coding to decoding, changing the reference numeral of the predictive quantization parameter deriving unit from 114 to 205 and the reference numeral of the coding information storage memory from 113 to 204, and changing the output destination of the predictive quantization parameter from the differential quantization parameter generation unit 111 to the quantization parameter generation unit 203. The fifth embodiment is a combination of the first and second embodiments. When a coding block to be coded or decoded is adjacent to the left tree block, using the quantization parameter of the coded block of the tree block adjacent to the left for prediction is allowed. When the coding block is adjacent to the upper tree block, using the quantization parameter of the coded block in the upper tree block for prediction is prohibited, and the quantization parameter of the block coded before or immediately before the coding block to be coded is used for prediction instead of the quantization parameter of the coded block in the upper tree block.

Figure 23:
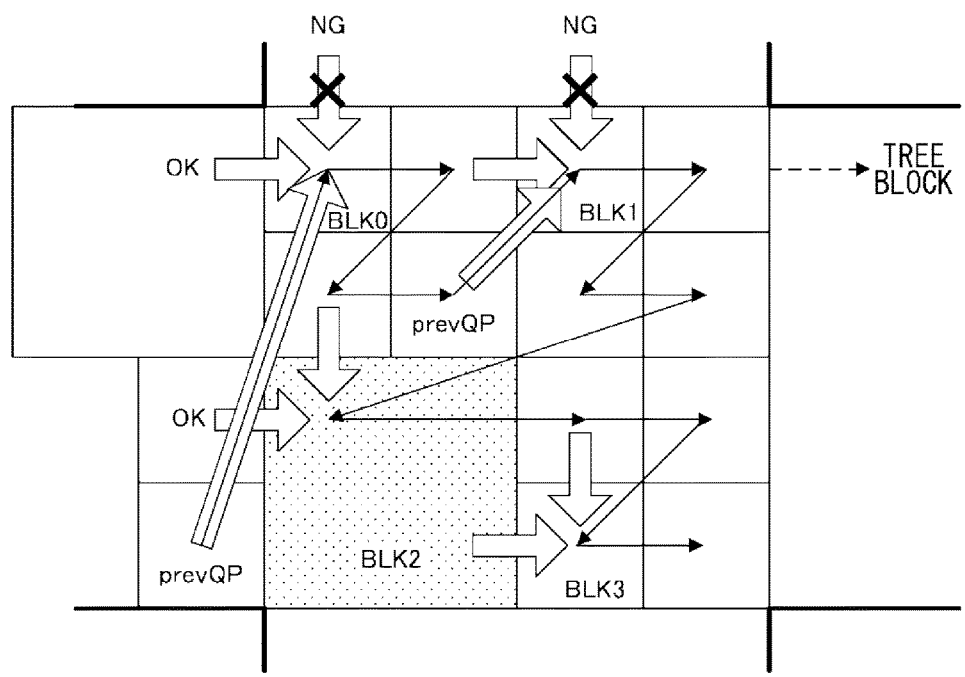
FIG. 23 is a diagram showing the reference of a predictive quantization parameter of a coding block in a fourth embodiment.

In FIG. 23, the direction of a coded block referred to by each coding block in a partitioned tree block is shown by the thick arrow. In FIG. 23, the thin solid line indicates a coding sequence, and a coding block to be coded gives priority to a neighboring coded block over a coded block that is close to the coding block in the coding sequence.

BLK0 and BLK1 that are located at the upper end of the tree block in FIG. 23 border the upper tree block. Accordingly, the quantization parameter of the coded block adjacent to the top is not used for prediction, and the quantization parameter of the block coded before or immediately before the coding block to be coded and the quantization parameter of the coded block adjacent to the left are used for prediction instead. In BLK2 and BLK3, coded blocks adjacent to the top are present in the same tree block. Accordingly, the quantization parameter of the upper coded block and the quantization parameter of the left coded block are used for prediction.

Figure 24:
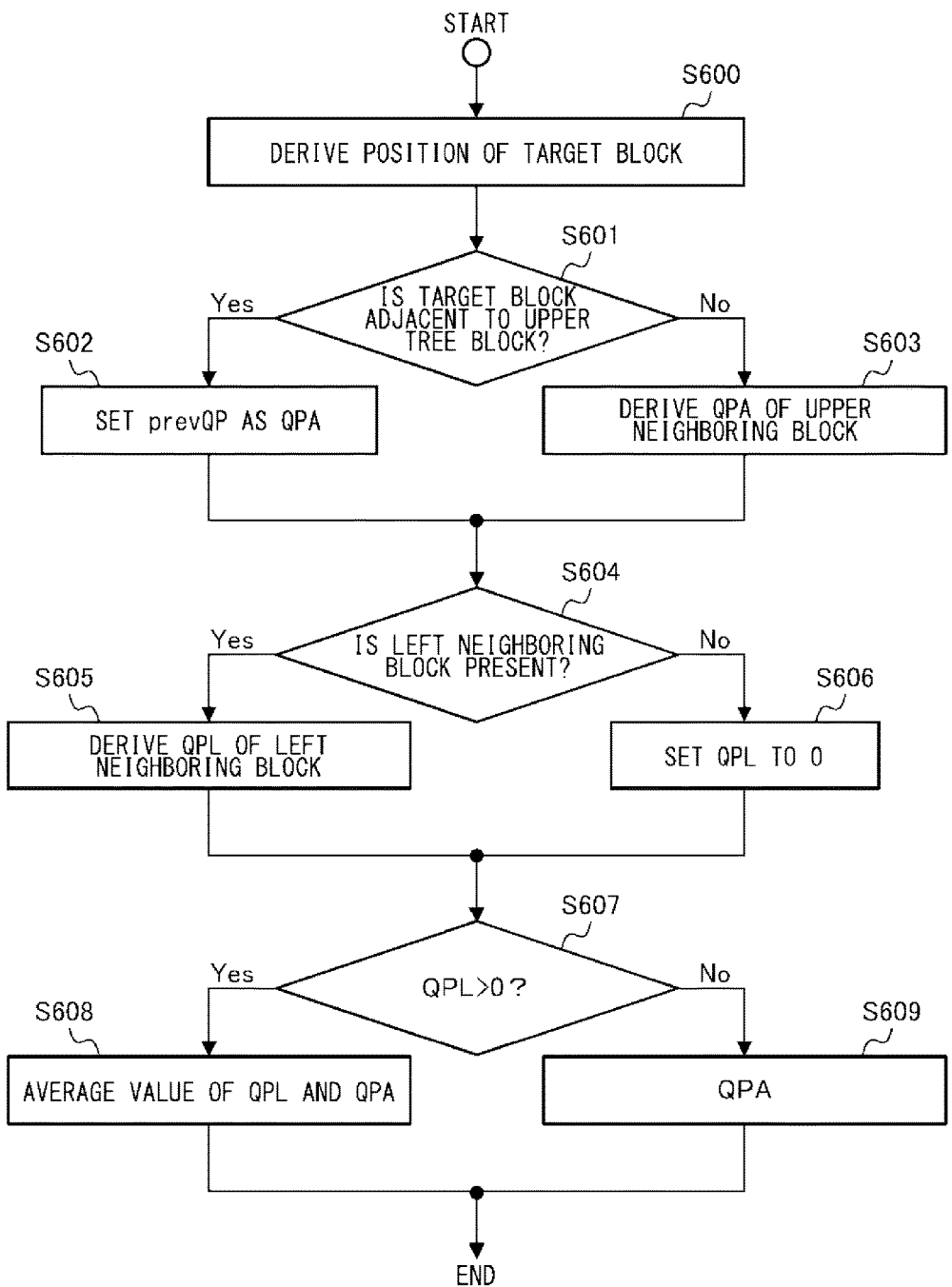
FIG. 24 is a flowchart for explaining the operation of a predictive quantization parameter deriving unit of the fourth embodiment.

The detailed operation of the predictive quantization parameter deriving unit 114 in the fifth embodiment will be described. FIG. 24 is a flowchart showing the operation of the predictive quantization parameter deriving unit 114 in the fifth embodiment.

First, position information of a coding block to be coded is derived (S600). For the position information of the coding block, the upper left position of a tree block including the coding block is calculated with the upper left of the screen as a base point, and the position of the coding block is calculated from the upper left position of the tree block. Then, it is determined whether or not the coding block is adjacent to the upper tree block (S601). When the coding block is adjacent to the upper tree block (Yes in S601), that is, when the coding block is located at the upper end of the tree block, the upper neighboring block is included in the upper tree block. Accordingly, since the upper neighboring block is beyond the tree block boundary, the upper neighboring block is not used for quantization parameter prediction, and the quantization parameter prevQP of the coding block coded before or immediately before the coding block to be coded is set as QPA (S602).

On the other hand, when the coding block is not adjacent to the upper tree block (No in S601), that is, when the upper neighboring block is located in the same tree block as the coding block, the storage region stored in the coding information storage memory 113 is accessed from the reference position information of the upper left of the coding block, and the quantization parameter QPA of the upper neighboring block is supplied to the predictive quantization parameter deriving unit 114 (S603).

Then, it is determined whether or not there is a coded block adjacent to the left of the coding block (S604). When there is a block adjacent to the left (Yes in S604), the storage region stored in the coding information storage memory 113 is accessed from the reference position information of the upper left of the coding block, and a quantization parameter QPL of the left neighboring block is supplied to the predictive quantization parameter deriving unit 114 (S605). When there is no left neighboring block (No in S604), the quantization parameter QPL of the left neighboring block is set to 0 (S606).

Then, it is determined whether or not the quantization parameter of the left neighboring block is positive (S607). When the quantization parameter of the left neighboring block is positive (Yes in S607), the left neighboring block is present. Accordingly, the average value of the quantization parameters of the left and upper neighboring blocks is set as a predictive quantization parameter (S608). On the other hand, when the quantization parameter of the left neighboring block is not positive (No in S607), that is, when the quantization parameter of the left neighboring block is 0, the left neighboring block is not present. In this case, QPA is set as a predictive quantization parameter (S609). The predictive quantization parameter calculated in this manner is supplied to the differential quantization parameter generation unit 111.

According to the moving picture coding device of the embodiment, a quantization parameter coded for each block to be coded is derived by predicting an optimal predictive quantization parameter using the coding information and the quantization parameters of the neighboring coded blocks, and the difference between the quantization parameter and the predictive quantization parameter is taken to perform coding. As a result, since the code amount of the quantization parameter is reduced without changing the picture quality, it is possible to improve the coding efficiency.

In addition, since mounting as a common function for quantization parameter prediction is possible on the coding and decoding sides, it is possible to reduce the circuit size. This is because a neighboring coded block becomes a block, which is locally decoded for the prediction of the next coding block, on the coding side, and accordingly, the determination of quantization parameter prediction is realized so that inconsistency on the coding side and the decoding side is not caused.

In the above explanation, quantization parameter prediction has been performed with the coding block as a unit. However, if the number of coding blocks having a small block size is increased due to an increase in the number of partitions in a tree block, the assigned code amount per coding block in the code amount control becomes too small. In this case, the quantization parameter may not be calculated appropriately. In addition, the memory amount of the coding information storage memories 113 and 204 of the moving picture coding device 100 and the moving picture decoding device 200, in which coding information, such as the quantization parameter, is stored at the time of coding and decoding, is increased. Therefore, a block called a quantization group may be newly set as a unit for coding and transmission of the quantization parameter, and quantization parameter prediction may be performed in units of this block.

The quantization group is a block determined according to the size of a tree block, and the size is expressed as a value obtained by multiplying the length of the side of a block of the tree block by $1/2n$ times (n is an integer of 0 or more). That is, a value when the length of the side of a block of the tree block is shifted to the right by n bits is the length of the side of the quantization group. Since this value is determined by the block size as a tree block structure, the affinity with a tree block is high. In addition, since a tree block is partitioned into equal sizes, management and reading of quantization parameters stored in the coding information storage memories 113 and 204 can be simplified.

Figure 25:
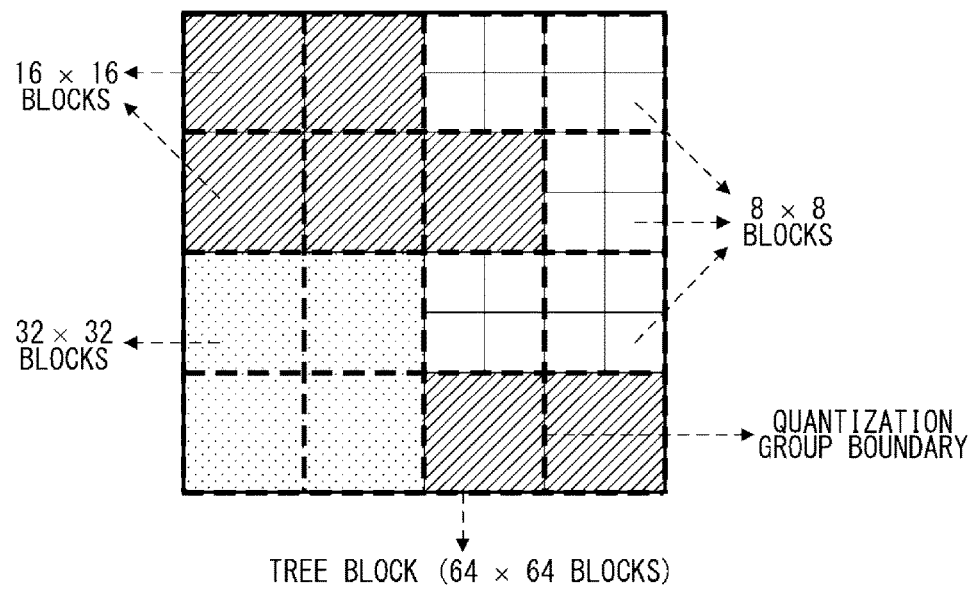
FIG. 25 is a diagram for explaining an example of a quantization group.

FIG. 25 shows an example in which a tree block is partitioned in a tree block structure. The block size of a tree block is set to 64×64, and the tree block is hierarchically partitioned into four parts. Partitioning into coding blocks of 32×32 blocks (dotted rectangle in FIG. 25), partitioning into coding blocks of 16×16 blocks (hatched rectangle in FIG. 25), and partitioning into coding blocks of 8×8 blocks (white rectangle in FIG. 25) are performed in first to third partitioning, respectively. Here, assuming that a quantization group is a rectangle block of 16×16, the quantization group is expressed by the thick dotted line in FIG. 25, and quantization parameter prediction is performed in units of a quantization group.

When the size of a coding block to be coded is larger than the block size of the quantization group (32×32 blocks), for example, a coding block expressed as a stippled rectangle in FIG. 25 is partitioned into four parts by the quantization group. Although the coding block is partitioned into four parts by the quantization group, the number of quantization parameters of the coding block is 1. Therefore, when the size of the coding block is larger than that of the quantization group, a differential quantization parameter after prediction of the quantization parameter of the coding block is coded and transmitted, and the same quantization parameter is stored in memory regions of the coding information storage memories 113 and 204 corresponding to each quantization group partitioned into four parts. Although the quantization parameter is duplicated in the memories, it becomes easy to access the quantization parameters of neighboring coded blocks in the quantization parameter prediction.

When the size of the coding block to be coded is the same as the block size of the quantization group (16×16 blocks), quantization parameter prediction is performed in the same manner as in the case of the quantization parameter prediction in units of a coding block described above.

When the size of the coding block to be coded is smaller than the block size of the quantization group (8×8 blocks), for example, in the case of a coding block expressed as a white rectangle in FIG. 25, four coding blocks are included in the quantization group. In this case, the coding blocks in the quantization group do not have separate quantization parameters but have one quantization parameter in the quantization group. Using this quantization parameter, each coding block is coded. In addition, although there is a method of calculating the average value or the like by selecting one of the quantization parameters of four coding blocks in a quantization group as a representative value as a quantization parameter of the quantization group, the present invention is not limited thereto in particular herein.

Figure 26:
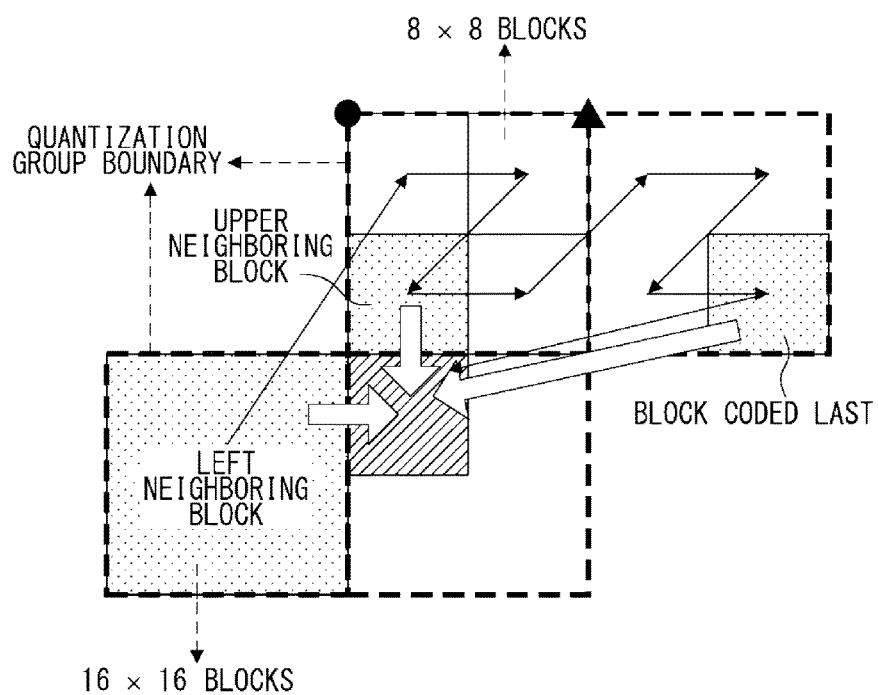
FIG. 26 is a diagram for explaining an example of the prediction of a quantization parameter in units of a quantization group.

FIG. 26 shows an example of quantization parameter prediction when a coding block is smaller than the block size of a quantization group. The hatched rectangle shown in FIG. 26 indicates a coding block to be coded, the gray rectangle indicates a coded block that is used in quantization parameter prediction by the quantization group including coding blocks, and the thin solid line indicates a coding sequence. The quantization parameter prediction is performed based on the position of a pixel at the upper left corner of the quantization group to be processed. When the quantization parameter of the coded block adjacent to the top is used for prediction, in the hatched rectangle shown in FIG. 26, the position of a neighboring coded block including a pixel, which is adjacent to a pixel above the pixel at the upper left corner of the quantization group including a coding block to be coded, is calculated, and the quantization parameter stored in the address corresponding to the position is called from the coding information storage memories 113 and 204. Similarly, when the quantization parameter of the coded block adjacent to the left is used for prediction, the position of a coded block including a pixel, which is adjacent to a pixel next to the left of the upper left pixel of the quantization group including a coding block to be coded, is calculated, and the quantization parameter recorded in the address corresponding to the position is called from the coding information storage memories 113 and 204. When coded blocks adjacent to the left and top of the pixel at the upper left corner of the quantization group including a coding block to be coded are beyond the tree block boundary, the quantization parameter of the coded block that is coded before or immediately before the coding block to be coded is used. Therefore, addresses on the memory, which are stored when the quantization parameter is stored in the coding information storage memories 113 and 204 in the coding, are temporarily stored, and the quantization parameter stored in the address corresponding to the position before or immediately before the coding block to be coded is called from the coding information storage memories 113 and 204. Thus, it is possible to predict the quantization parameter of the coding block to be coded.

As described above, quantization parameter prediction in units of a quantization group can be performed in the same manner as the quantization parameter prediction in units of a coding block described above.

In addition, the block size may be directly described in the header information of the bit stream, or the bit shift amount indicating whether or not to apply 1/2n times (n is an integer of 0 or more) the tree block size may be described as the block size of the quantization group. For example, in the header information of a picture, a flag cu_qp_delta_enable_flag indicating whether or not to perform quantization parameter prediction in units of a picture, describe the differential quantization parameter in a bitstream, and transmit the bitstream is defined, and a parameter diff_cu_qp_delta_depth that determines the size of the quantization group is described in the bitstream only when the flag cu_qp_delta_enable_flag is valid (set to "1"). When the size of a tree block is expressed as 2n, the size of the quantization group is expressed as the exponentiation of 2 with a value obtained by subtracting diff_cu_qp_delta_depth from the exponent n as the exponent. In addition, the size of the quantization group may be determined implicitly in coding and decoding, instead of describing the size of the quantization group in the bitstream in particular.

The bitstream of moving pictures output from the moving picture coding device of the embodiment described above has a specific data format so that decoding according to the coding method used in the embodiment is possible, and the moving picture decoding device corresponding to the moving picture coding device can decode the bitstream of the specific data format.

When a wired or wireless network is used to exchange a bitstream between the moving picture coding device and the moving picture decoding device, the bitstream may be transmitted after being converted into a data format suitable for the transmission mode of communication channel. In this case, a moving picture transmission device, which converts the bitstream output from the moving picture coding device into coding data of the data format suitable for the transmission mode of communication channel and transmits the converted bitstream through a network, and a moving picture receiving device, which receives the coding data through the network, restores the coding data to the bitstream, and supplied the restored bitstream to the moving picture decoding device, are provided.

The moving picture transmission device includes a memory that buffers a bitstream output from the moving picture coding device, a packetizing unit that packetizes the bitstream, and a transmission unit that transmits the packetized coding data through a network. The moving picture receiving device includes a receiving unit that receives the packetized coded data through a network, a memory that buffers the received coding data, and a packetizing unit that packetizes the coding data to generate a bitstream and supplies the bitstream to the moving picture decoding device.

The above processing related to coding and decoding can be realized as a transmission device, a storage device, and a receiving device using hardware, and can also be realized by firmware stored in a ROM (read only memory), a flash memory, or the like or by software of a computer or the like. The firmware program and the software program can be provided in a state where the programs are recorded on a recording medium that can be read by a computer or the like, or can be provided from a server through a wired or wireless network, or can be provided as data broadcasting, such as ground-based broadcasting or digital satellite broadcasting.

Up to now, the present invention has been described based on the embodiments. The embodiments are illustrative, and it will be understood by those skilled in the art that various modifications of the combination of the respective constituent elements or the respective processes can be made and such modifications still fall within the technical scope of the present invention.

[Item 1] A moving picture coding device that codes moving pictures in units of a block by partitioning a first block, which is obtained by partitioning each picture of the moving pictures into predetermined sizes, into one or a plurality of second blocks, the device comprising:

a quantization parameter calculation unit configured to calculate a quantization parameter of the second block;

a predictive quantization parameter deriving unit configured to derive a predictive quantization parameter of the second block using quantization parameters of a third block adjacent to the left of the second block and a fourth block adjacent to the top of the second block;

a differential quantization parameter generation unit configured to generate a differential quantization parameter of the second block from a difference between the quantization parameter of the second block and the predictive quantization parameter of the second block; and a coding unit configured to code the differential quantization parameter of the second block, wherein the predictive quantization parameter deriving unit sets the quantization parameter of the third block as a first quantization parameter when the third block is at a position not beyond a boundary of the first block, sets a quantization parameter of a fifth block coded before the second block as the first quantization parameter when the third block is at a position beyond the boundary of the first block, sets the quantization parameter of the fourth block as a second quantization parameter when the fourth block is at a position not beyond the boundary of the first block, sets the quantization parameter of the fifth block as the second quantization parameter when the fourth block is at a position beyond the boundary of the first block, and derives the predictive quantization parameter of the second block using the first and second quantization parameters.

[Item 2] The moving picture coding device according to item 1, wherein the predictive quantization parameter deriving unit sets an average value of the first and second quantization parameters as the predictive quantization parameter.

[Item 3] The moving picture coding device according to item 1 or 2, wherein size information of the second block is described in a bitstream.

[Item 4] A moving picture coding device that codes moving pictures in units of a coding block by partitioning a block, which is obtained by partitioning each picture of the moving pictures into predetermined sizes, into one or a plurality of coding blocks, the device comprising:

a quantization parameter calculation unit configured to calculate a quantization parameter of the coding block;

a predictive quantization parameter deriving unit configured to derive a predictive quantization parameter of the coding block using quantization parameters of coded neighboring blocks adjacent to the coding block;

a differential quantization parameter generation unit configured to generate a differential quantization parameter of the coding block from a difference between the quantization parameter of the coding block and the predictive quantization parameter of the coding block; and a coding unit configured to code the differential quantization parameter of the coding block, wherein when a neighboring block adjacent to the coding block in a predetermined direction of the coding block is at a position beyond a boundary of the block having the predetermined size, the predictive quantization parameter deriving unit derives the predictive quantization parameter of the coding block using quantization parameters of other coded blocks that are different from the neighboring block adjacent to the coding block in the predetermined direction.

[Item 5] A moving picture coding method of coding moving pictures in units of a block by partitioning a first block, which is obtained by partitioning each picture of the moving pictures into predetermined sizes, into one or a plurality of second blocks, the method comprising:

a quantization parameter calculation step of calculating a quantization parameter of the second block;

a predictive quantization parameter deriving step of deriving a predictive quantization parameter of the second block using quantization parameters of a third block adjacent to the left of the second block and a fourth block adjacent to the top of the second block;

a differential quantization parameter generation step of generating a differential quantization parameter of the second block from a difference between the quantization parameter of the second block and the predictive quantization parameter of the second block; and a coding step of coding the differential quantization parameter of the second block, wherein in the predictive quantization parameter deriving step, the quantization parameter of the third block is set as a first quantization parameter when the third block is at a position not beyond a boundary of the first block, a quantization parameter of a fifth block coded before the second block is set as the first quantization parameter when the third block is at a position beyond the boundary of the first block, the quantization parameter of the fourth block is set as a second quantization parameter when the fourth block is at a position not beyond the boundary of the first block, the quantization parameter of the fifth block is set as the second quantization parameter when the fourth block is at a position beyond the boundary of the first block, and the predictive quantization parameter of the second block is derived using the first and second quantization parameters.

[Item 6] A moving picture coding program for coding moving pictures in units of a block by partitioning a first block, which is obtained by partitioning each picture of the moving pictures into predetermined sizes, into one or a plurality of second blocks, the program causing a computer to execute:

a quantization parameter calculation step of calculating a quantization parameter of the second block;

a predictive quantization parameter deriving step of deriving a predictive quantization parameter of the second block using quantization parameters of a third block adjacent to the left of the second block and a fourth block adjacent to the top of the second block;

a differential quantization parameter generation step of generating a differential quantization parameter of the second block from a difference between the quantization parameter of the second block and the predictive quantization parameter of the second block; and a coding step of coding the differential quantization parameter of the second block, wherein in the predictive quantization parameter deriving step, the quantization parameter of the third block is set as a first quantization parameter when the third block is at a position not beyond a boundary of the first block, a quantization parameter of a fifth block coded before the second block is set as the first quantization parameter when the third block is at a position beyond the boundary of the first block, the quantization parameter of the fourth block is set as a second quantization parameter when the fourth block is at a position not beyond the boundary of the first block, the quantization parameter of the fifth block is set as the second quantization parameter when the fourth block is at a position beyond the boundary of the first block, and the predictive quantization parameter of the second block is derived using the first and second quantization parameters.

[Item 7] A moving picture decoding device that decodes a bitstream in which moving pictures are coded by partitioning a first block, which is obtained by partitioning each picture of the moving pictures into predetermined sizes, into one or a plurality of second blocks, the device comprising:

a decoding unit configured to extract a differential quantization parameter of the second block by decoding the bitstream;

a predictive quantization parameter deriving unit configured to derive a predictive quantization parameter of the second block using quantization parameters of a third block adjacent to the left of the second block and a fourth block adjacent to the top of the second block; and a quantization parameter generation unit configured to generate a quantization parameter of the second block by adding the differential quantization parameter of the second block and the predictive quantization parameter of the second block, wherein the predictive quantization parameter deriving unit sets the quantization parameter of the third block as a first quantization parameter when the third block is at a position not beyond a boundary of the first block, sets a quantization parameter of a fifth block decoded before the second block as the first quantization parameter when the third block is at a position beyond the boundary of the first block, sets the quantization parameter of the fourth block as a second quantization parameter when the fourth block is at a position not beyond the boundary of the first block, sets the quantization parameter of the fifth block as the second quantization parameter when the fourth block is at a position beyond the boundary of the first block, and derives the predictive quantization parameter of the second block using the first and second quantization parameters.

[Item 8] The moving picture decoding device according to item 7, wherein the predictive quantization parameter deriving unit sets an average value of the first and second quantization parameters as the predictive quantization parameter.

[Item 9] The moving picture decoding device according to item 7 or 8, wherein size information of the second block is extracted from a bit stream and is set as a size of the second block.

[Item 10] A moving picture decoding device that decodes a bitstream in which moving pictures are coded in units of a coding block by partitioning a block, which is obtained by partitioning each picture of the moving pictures into predetermined sizes, into one or a plurality of coding blocks, the device comprising:

a decoding unit configured to extract a differential quantization parameter of a decoding block by decoding the bit stream in units of a decoding block;

a predictive quantization parameter deriving unit configured to derive a predictive quantization parameter of the decoding block according to a prediction mode of the decoding block using quantization parameters of decoded neighboring blocks adjacent to the decoding block; and a quantization parameter generation unit configured to generate a quantization parameter of the decoding block by adding the differential quantization parameter of the decoding block and the predictive quantization parameter of the decoding block, wherein when a neighboring block adjacent to the decoding block in a predetermined direction of the decoding block is at a position beyond a boundary of the block having the predetermined size, the predictive quantization parameter deriving unit derives the predictive quantization parameter of the decoding block using quantization parameters of other decoded blocks that are different from the neighboring block adjacent to the decoding block in the predetermined direction.

[Item 11] A moving picture decoding method of decoding a bitstream in which moving pictures are coded by partitioning a first block, which is obtained by partitioning each picture of the moving pictures into predetermined sizes, into one or a plurality of second blocks, the method comprising:

a decoding step of extracting a differential quantization parameter of the second block by decoding the bitstream;

a predictive quantization parameter deriving step of deriving a predictive quantization parameter of the second block using quantization parameters of a third block adjacent to the left of the second block and a fourth block adjacent to the top of the second block; and a quantization parameter generation step of generating a quantization parameter of the second block by adding the differential quantization parameter of the second block and the predictive quantization parameter of the second block, wherein in the predictive quantization parameter deriving step, the quantization parameter of the third block is set as a first quantization parameter when the third block is at a position not beyond a boundary of the first block, a quantization parameter of a fifth block decoded before the second block is set as the first quantization parameter when the third block is at a position beyond the boundary of the first block, the quantization parameter of the fourth block is set as a second quantization parameter when the fourth block is at a position not beyond the boundary of the first block, the quantization parameter of the fifth block is set as the second quantization parameter when the fourth block is at a position beyond the boundary of the first block, and the predictive quantization parameter of the second block is derived using the first and second quantization parameters.

[Item 12] A moving picture decoding program for decoding a bitstream in which moving pictures are coded by partitioning a first block, which is obtained by partitioning each picture of the moving pictures into predetermined sizes, into one or a plurality of second blocks, the program causing a computer to execute:

a decoding step of extracting a differential quantization parameter of the second block by decoding the bitstream;

a predictive quantization parameter deriving step of deriving a predictive quantization parameter of the second block using quantization parameters of a third block adjacent to the left of the second block and a fourth block adjacent to the top of the second block; and a quantization parameter generation step of generating a quantization parameter of the second block by adding the differential quantization parameter of the second block and the predictive quantization parameter of the second block, wherein in the predictive quantization parameter deriving step, the quantization parameter of the third block is set as a first quantization parameter when the third block is at a position not beyond a boundary of the first block, a quantization parameter of a fifth block decoded before the second block is set as the first quantization parameter when the third block is at a position beyond the boundary of the first block, the quantization parameter of the fourth block is set as a second quantization parameter when the fourth block is at a position not beyond the boundary of the first block, the quantization parameter of the fifth block is set as the second quantization parameter when the fourth block is at a position beyond the boundary of the first block, and the predictive quantization parameter of the second block is derived using the first and second quantization parameters.

What is claimed is:

1. A moving picture decoding device that decodes a bitstream in which moving pictures are coded by partitioning a first block, which is obtained by partitioning each picture of the moving pictures into predetermined sizes, into one or a plurality of second blocks, the device comprising:
   a decoding unit configured to extract a differential quantization parameter of the second block by decoding the bitstream;
   a predictive quantization parameter deriving unit configured to derive a predictive quantization parameter of the second block using quantization parameters of a third block adjacent to the left of the second block and a fourth block adjacent to the top of the second block; and
   a quantization parameter generation unit configured to generate a quantization parameter of the second block by adding the differential quantization parameter of the second block and the predictive quantization parameter of the second block, wherein
   the predictive quantization parameter deriving unit sets the quantization parameter of the third block as a first quantization parameter when the third block is at a position not beyond a boundary of the first block, sets a quantization parameter of a fifth block decoded before the second block as the first quantization parameter when the third block is at a position beyond the boundary of the first block so as to set the first quantization parameter having a non-zero value regardless of the position for the boundary of the first block, sets the quantization parameter of the fourth block as a second quantization parameter when the fourth block is at a position not beyond the boundary of the first block, sets the quantization parameter of the fifth block as the second quantization parameter when the fourth block is at a position beyond the boundary of the first block so as to set the second quantization parameter having a non-zero value regardless of the position for the boundary of the first block, and derives an average of the first and second quantization parameters as the predictive quantization parameter of the second block regardless of the position of the third block or the fourth block, or both the third and fourth blocks, with respect to the boundary of the first block.

2. A moving picture decoding method of decoding a bitstream in which moving pictures are coded by partitioning a first block, which is obtained by partitioning each picture of the moving pictures into predetermined sizes, into one or a plurality of second blocks, the method comprising:
   a decoding step of extracting a differential quantization parameter of the second block by decoding the bitstream;
   a predictive quantization parameter deriving step of deriving a predictive quantization parameter of the second block using quantization parameters of a third block adjacent to the left of the second block and a fourth block adjacent to the top of the second block; and
   a quantization parameter generation step of generating a quantization parameter of the second block by adding the differential quantization parameter of the second block and the predictive quantization parameter of the second block, wherein
   in the predictive quantization parameter deriving step, the quantization parameter of the third block is set as a first quantization parameter when the third block is at a position not beyond a boundary of the first block, a quantization parameter of a fifth block decoded before the second block is set as the first quantization parameter when the third block is at a position beyond the boundary of the first block so as to set the first quantization parameter having a non-zero value regardless of the position for the boundary of the first block, the quantization parameter of the fourth block is set as a second quantization parameter when the fourth block is at a position not beyond the boundary of the first block, the quantization parameter of the fifth block is set as the second quantization parameter when the fourth block is at a position beyond the boundary of the first block so as to set the second quantization parameter having a non-zero value regardless of the position for the boundary of the first block, and an average of the first and second quantization parameters as the predictive quantization parameter of the second block is derived regardless of the position of the third block or the fourth block, or both the third and fourth blocks, with respect to the boundary of the first block.

3. A recording medium having a moving picture decoding program for decoding a bitstream in which moving pictures are coded by partitioning a first block, which is obtained by partitioning each picture of the moving pictures into predetermined sizes, into one or a plurality of second blocks, the program causing a computer to execute:
   a decoding step of extracting a differential quantization parameter of the second block by decoding the bitstream;
   a predictive quantization parameter deriving step of deriving a predictive quantization parameter of the second block using quantization parameters of a third block adjacent to the left of the second block and a fourth block adjacent to the top of the second block; and
   a quantization parameter generation step of generating a quantization parameter of the second block by adding the differential quantization parameter of the second block and the predictive quantization parameter of the second block, wherein
   in the predictive quantization parameter deriving step, the quantization parameter of the third block is set as a first quantization parameter when the third block is at a position not beyond a boundary of the first block, a quantization parameter of a fifth block decoded before the second block is set as the first quantization parameter when the third block is at a position beyond the boundary of the first block so as to set the first quantization parameter having a non-zero value regardless of the position for the boundary of the first block, the quantization parameter of the fourth block is set as a second quantization parameter when the fourth block is at a position not beyond the boundary of the first block, the quantization parameter of the fifth block is set as the second quantization parameter when the fourth block is at a position beyond the boundary of the first block so as to set the second quantization parameter having a non-zero value regardless of the position for the boundary of the first block, and an average of the first and second quantization parameters as the predictive quantization parameter of the second block is derived regardless of the position of the third block or the fourth block, or both the third and fourth blocks, with respect to the boundary of the first block.

* * * * *